(12) United States Patent
Schmitz et al.

(10) Patent No.: US 10,257,360 B2
(45) Date of Patent: Apr. 9, 2019

(54) SYSTEM AND METHOD TO IMPROVE MANAGEMENT DURING A CONFERENCE CALL

(71) Applicant: SWN Communications, Inc., Secaucus, NJ (US)

(72) Inventors: Anthony Schmitz, Clifton, NJ (US); Alexandros Tsepetis, Wenham, MA (US)

(73) Assignee: SWN COMMUNICATIONS INC.

( * ) Notice: Subject to any disclaimer, the term of this patent is extended or adjusted under 35 U.S.C. 154(b) by 106 days.

(21) Appl. No.: 15/259,128

(22) Filed: Sep. 8, 2016

(65) Prior Publication Data

US 2017/0142259 A1 May 18, 2017

Related U.S. Application Data

(63) Continuation-in-part of application No. 14/507,967, filed on Oct. 7, 2014.
(Continued)

(51) Int. Cl.
*H04M 3/56* (2006.01)
*H04M 3/424* (2006.01)
(Continued)

(52) U.S. Cl.
CPC ........ *H04M 3/565* (2013.01); *H04L 12/4625* (2013.01); *H04L 51/043* (2013.01);
(Continued)

(58) Field of Classification Search
CPC ................. H04M 3/565; H04M 3/424; H04M 2203/558; H04M 2203/5081; H04W 4/206; H04W 4/22; H04W 4/12; H04W 4/21; H04L 12/1895; H04L 51/043; H04L 12/4625
(Continued)

(56) References Cited

U.S. PATENT DOCUMENTS

| | | | |
|---|---|---|---|
| 6,535,730 B1 * | 3/2003 | Chow | H04W 76/15 455/416 |
| 2001/0033643 A1 * | 10/2001 | Mulvey | H04M 1/663 379/196 |

(Continued)

*Primary Examiner* — Anthony S Addy
*Assistant Examiner* — Farid Seyedvosoghi
(74) *Attorney, Agent, or Firm* — Jennifer Meredith, Esq.; Meredith & Keyhani, PLLC

(57) ABSTRACT

A method to operate with electronic computer hardware to manage operations during simultaneous conference calls, the method comprising: processing each ongoing conference call by iteratively performing at a given time integral the following steps for a given conference call; identifying a set of attributes of the given conference call from a conference call database, the set of attributes comprising: an end time, a set of participants, and a set of participant devices of the given conference call; displaying, in real time, a calendar on the display of each device from the set of participant devices; initiating an auto dial procedure for a subsequent conference call after reviewing the calendar to determine if a subsequent call is scheduled for the given time integral; and terminating the given conference call if the end time of the given conference call is scheduled at the given time integral.

18 Claims, 36 Drawing Sheets

Related U.S. Application Data

(60) Provisional application No. 62/216,569, filed on Sep. 10, 2015, provisional application No. 61/888,565, filed on Oct. 9, 2013, provisional application No. 61/888,569, filed on Oct. 9, 2013.

(51) Int. Cl.
| | |
|---|---|
| *H04W 4/21* | (2018.01) |
| *H04W 4/90* | (2018.01) |
| *H04L 12/58* | (2006.01) |
| *H04W 4/12* | (2009.01) |
| *H04L 12/46* | (2006.01) |
| *H04L 12/18* | (2006.01) |

(52) U.S. Cl.
CPC ............ *H04M 3/424* (2013.01); *H04W 4/12* (2013.01); *H04W 4/21* (2018.02); *H04W 4/90* (2018.02); *H04L 12/1895* (2013.01); *H04M 2203/5081* (2013.01); *H04M 2203/558* (2013.01)

(58) Field of Classification Search
USPC ........................................ 455/404.2
See application file for complete search history.

(56) References Cited

U.S. PATENT DOCUMENTS

| | | | | |
|---|---|---|---|---|
| 2005/0152523 | A1* | 7/2005 | Fellenstein | H04M 3/56 379/202.01 |
| 2008/0082925 | A1* | 4/2008 | Brush | G06Q 10/109 715/744 |
| 2010/0208880 | A1* | 8/2010 | Gartner | H04L 12/1818 379/202.01 |
| 2011/0252366 | A1* | 10/2011 | Balasubramanian | G06Q 10/10 715/809 |
| 2012/0163577 | A1* | 6/2012 | Buford | H04L 12/1822 379/202.01 |
| 2013/0017780 | A1* | 1/2013 | Rose | H04W 4/16 455/41.1 |
| 2013/0331075 | A1* | 12/2013 | Hole | H04W 4/02 455/416 |

\* cited by examiner

SYSTEM AND METHOD TO IMPROVE MANAGEMENT DURING A CONFERENCE CALL

FIELD OF DISCLOSURE

The claimed system and method improve the ability of a user to schedule, initiate and manage operations prior to and during a conference call held via a conference, all applications may be operating on a mobile phone device. The conference call application on the mobile phone device enables a user of said mobile phone device to execute operations which significantly expand and improve the ability of a user to schedule, initiate and manage conference calls.

BRIEF DESCRIPTION OF RELATED ART

The modern business world is marked by state of the art conference call capabilities that enable people to connect with others across the globe via telephonic networks, cellular networks, and internet based voiceover IP technologies. However, in spite of features made available through modern technology, unsatisfied needs remain. For example, if a participant is dropped from an ongoing conference call due to malfunctions or other issues with the existing technology, that participant must redial the call number and reenter the PIN. This may take several minutes since the participant may have to locate the conference call number, the PIN number and redial the located conference call number and the PIN number before the disconnected participant is reconnected to the conference call.

In other words, the disconnected participant may be unavailable for the time period in which the call is dropped. Notably, other call participants or the organizer herself may not be aware of or notified of their colleague's absence. Some conference calling systems may require each participant to announce every time a participant joins the call. In these systems, the conference call participants may at least be notified after the fact that a specific participant was disconnected at some point in the conference call. Identifying a disconnected participant may be easier for the conference call comprising fewer participants. In this situation connected participants may hear a disconnection indication or otherwise note the disconnected status of the disconnected participant.

In the conference call comprising a large number of participants, identifying a disconnected participant may be more difficult. Similarly identifying a disconnected participant may be more difficult in the conference call where participants do not know one another. At times, the conference call may continue without anyone knowing and noticing the disconnected status of the disconnected participant. As such, the group may proceed to make decisions without the disconnected participant, the decisions that are supposed to be made in the presence of the disconnected participant. These decisions where the disconnected participant was supposed to be present but was not present may very well have an impact on the responsibility and the workload of the disconnected participant.

Alternatively, a conference call participant may alert the organizer after noticing the disconnected status of the disconnected participant. The conference call organizer may then have to leave the conference momentarily, locate the contact information of the disconnected participant, optionally locate the conference call and PIN information in the event if the disconnected participant does not have this information readily available, and call the disconnected participant to ask him to dial back in the conference call. In the conventional conference calling systems, the organizer may optionally bridge in the disconnected participant, even then the organizer may have to locate the contact information of the disconnected participant and momentarily step out of the conference call before bridging in the disconnected participant.

Traditional conference calling systems may require a call participant to dial an access number, enter an access code and then be connected to the call. Furthermore, the traditional conference calling systems may require a disconnected conference call participant to dial back into the conference call by dialing an access number and then entering an access code.

Thus, a problem is presented by the conventional conference calling system, whereby at least one participant or a conference call organizer has to place the conference call on hold before bridging in the disconnected participant. Thus, there is a need for a conference calling system where neither participant nor organizer have to momentarily leave the conference call before reconnecting a disconnected participant to the conference call. Furthermore, there is a need for a conference calling system where neither participant nor organizer have to locate conference call dialing number and PIN information before reconnecting a disconnected participant to the conference call.

It would be beneficial if the conference calling system automatically detects the disconnected status of the disconnected participant and by itself, without intervention of any of the conference call participants, initiates a redialing procedure to reconnect a disconnected participant to the conference call. This feature may be very crucial for time sensitive deliverables such as software products, finance related products and research and development in defense, national security and medicine, and the like.

SUMMARY OF THE INVENTION

A method for managing operations during a first conference call between a first communication device and a plurality of communication devices, comprising the (1) displaying a calendar to identify a set of attributes of at least one conference call (2) scheduling and initiating a second conference call during the ongoing first conference call (3) displaying a participant status of each participant of the conference call; (4) displaying a conference call status of each ongoing conference calls, and a connection interface whereby a participant may selectively join an ongoing conference call; (5) displaying real time data pertaining to each participant of each conference call; and (6) initiating a chat session between at least two communication devices of the plurality of communication devices during the ongoing first conference call, and displaying a chat participant status on the at least two communication devices.

DETAILED DESCRIPTION OF THE INVENTION

Figure 1:
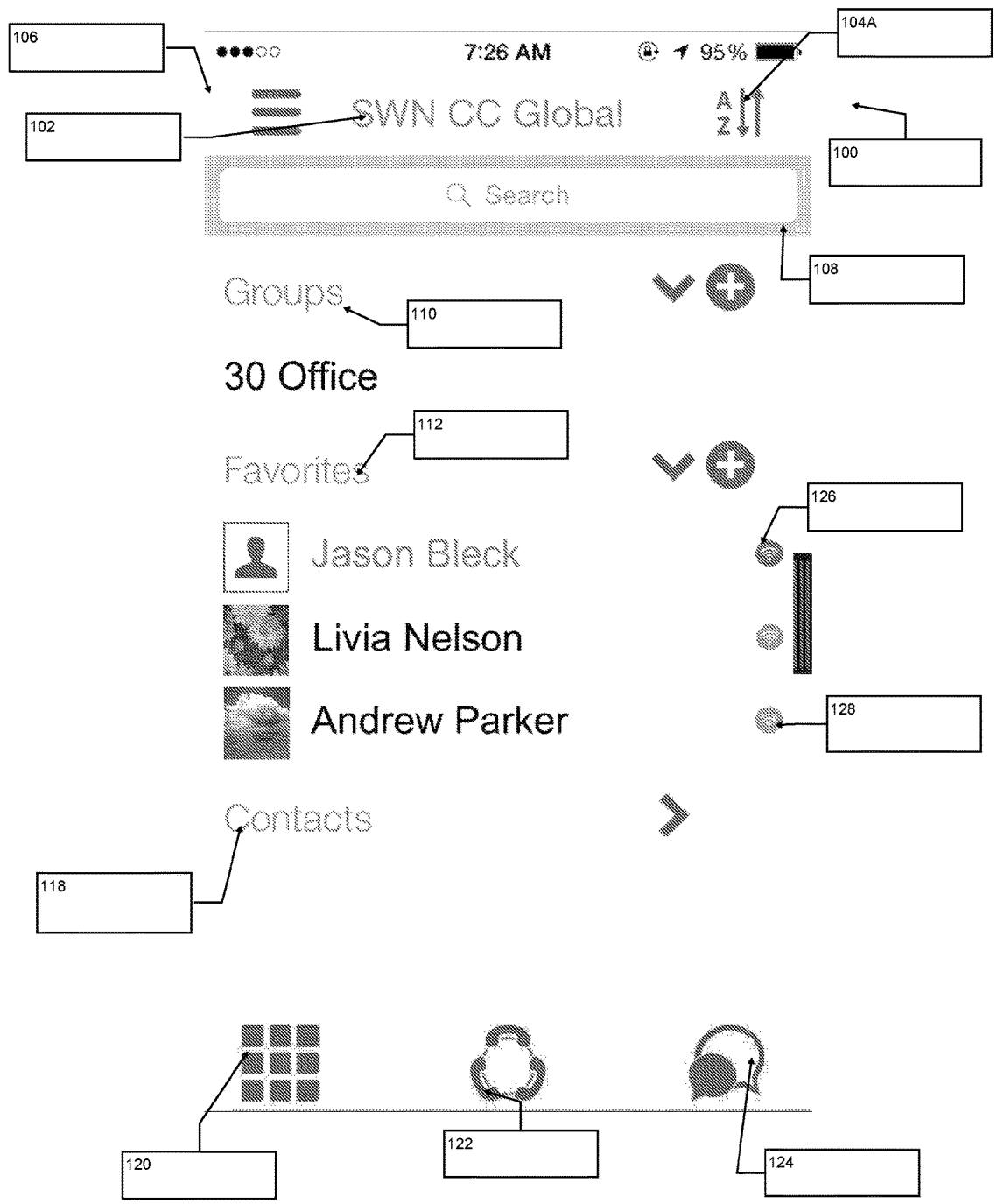
FIG. 1 represents an interface showing a list of potential call participants organized into groups and favorites.

A method for non-transitory computer readable medium containing computer instructions configured to operate with electronic computer hardware to manage operations during simultaneous conference calls is described. The method comprising: processing each ongoing conference call by iteratively performing at a given time integral the following steps for a given conference call: (1) identifying a set of attributes of the given conference call from a conference call database, the set of attributes comprising: an end time, a set of participants, and a set of participant devices of the given conference call; (2) displaying, in real time, a calendar on the display of each device from the set of participant devices; (3) initiating an auto dial procedure for a subsequent conference call after reviewing the calendar to determine if a subsequent call is scheduled for the given time integral; and (4) terminating the given conference call if the end time of the given conference call is scheduled at the given time integral.

The method of claim further comprises the step of processing each ongoing conference call comprising the steps of: (1) monitoring a connection status of each device from the set of participant devices and displaying the monitored connection status on the set of participants devices; (2) identifying a set of disconnected devices from the set of participant devices, wherein the disconnected device is previously connected but currently disconnected from the given conference call; and (3) modifying the connection status of each disconnected device from the set of disconnected devices after performing an auto redial procedure for reconnecting each disconnected device with the given conference call.

The autodial procedure of the disclosed method comprises the steps of (1) ascertaining an identity, a contact information and a preferred mode of communication of an organizer of the given conference call via an organizer database; (2) ascertaining an identity, a contact information and a preferred mode of communication of the each invitee of the conference call via a participant database; (3) presenting a conference call invitation (invitation) to each invitee of the conference call after connecting the organizer with the conference call; (4) receiving a response to the invitation from each invitee of the conference call; (5) adding each invitee sending an acceptance response to the invitation to generate a list of participants; and (6) establishing a conference call connection between the organizer and each participant in the list of participants.

The auto redial procedure comprises the steps of: (1) verifying that the disconnected device sent an acceptance response to the invitation; (2) ascertaining an identity, a contact information and a preferred mode of communication of the disconnected device via the participant database; (3) presenting a second conference call connection invitation (second invitation) to the disconnected device; (4) receiving a second response to the second invitation from disconnected device; and (5) establishing a conference call connection between the participants of the given conference call and the disconnected device if the second response is an acceptance response.

The method further comprising the steps of: (1) maintaining a set of records in the conference call database, each record comprising: a conference call identifier, a date, a start time, an end time, a list of intended participant identifiers, a list of actual participants, a set of media files exchanged, and a status; (2) maintaining a set of records in the participant database, each record comprising: a participant identifier, a list of devices associated with each participant, a preferred mode of communication, and a participation history; and (3) maintaining a set of records in the organizer database, each record comprising: an organizer identifier, a list of devices associated with each organizer, a preferred mode of communication, and a participation history indicating at least one conference call identifier.

The method further comprising displaying the calendar to schedule a subsequent conference call, wherein the subsequent conference call is a future conference call and wherein the step of displaying the calendar comprises the steps of: (1) selecting a future date, a start time, and a set of invitees for the subsequent conference call; and (2) performing on the future date, the auto dial procedure for each participant from the list of participants to connect each participant to the subsequent conference call.

The method, further comprises adding each participant sending a rejection response to the invitation to a do not call database. Additionally, the step of displaying the calendar further comprises the following steps if the subsequent conference call is scheduled on a present day: (1) selecting a start time for the subsequent conference call; and (2) performing the autodial procedure for each participant from the list of participants to connect each participant to the subsequent call. (3) presenting a visual indication of the automatic redial to the conference call organizer after performing the auto redial procedure.

The claimed system and method improve the ability of a user to schedule, initiate and manage operations prior to and during a conference call. Most of the applications described herein may be operating on a mobile phone device. The conference call application on the mobile phone device may enable a user of said mobile phone device to execute operations which significantly expand and improve the ability of a user to schedule, initiate and manage conference calls. The disclosed system may provide a means for the conference call participants to be called by the system to join a conference call and not be required to dial a number or enter an access code in order to join a conference call.

Said operations include the ability for the participants in a conference call to be called by the system to join a conference call and not be required to dial a number or enter an access code to join a conference call. The claimed system may permit a conference call originator to select participants to join the call, select a date and time of the future conference call via a calendar feature. Notably on the date and time of the future conference call as selected by the call originator all conference call participants may be called by the disclosed system and may be automatically connected to the call.

In addition, if a conference call originator elects to start a call on the current date, and not at a date and time in the future via the calendar feature, the originator may select conference call participants from a menu; start the call and then all call participants may be automatically called to join a conference call. This provides a system that does not require anyone to call in to a conference call—instead a user may schedule a call using the calendar feature and all the participants may be called and join the call in this fashion.

Notably, in this context, the term invitee indicates a group of intended participants of a given conference call. As such, the disclosed system may present an invitation to join the given conference call on a display of the device of an invitee. If the invitee accepts the invitation, then the name of the invitee may be added to a list of participants, otherwise the name of the invitee may be added to a do not call list. This preference of the invitee may optionally be noted in the participant database for subsequent reference.

Said system may also automatically re-connect any conference call participant who participates via the application on the mobile device who may be disconnected from a conference call for any reason without that person being required to dial back into the conference call. According to one embodiment of the disclosed invention, the auto redial feature may be turned on by default, but the auto redial feature can be turned off by either the conference call originator or the conference call recipient.

The disclosed system may detect that a call participant is disconnected and automatically redial the number of the disconnected participant without any action required by the called party. Said system may permit a conference call participant to select to join any number of live conference calls to by selecting the live conference calls option from the menu and then selecting a specific live conference call from the list of conference calls. When a specific conference call is selected from the list of live conference calls, the user may be automatically bridged into the selected conference call.

Said system may send an email to all call participants in the event they do not have access to the application on the mobile device. Email may include a dial in number and access code to join a live conference call i.e. a conference call that is in progress. The number dialed and access code utilized to dial into the conference call may uniquely identify the participant joining into the call. This may provide the ability for a user who does not have access to the application to receive an email with a dial in number and access code uniquely associated with the live conference call. Upon the user dialing the assigned dial number and entering the access the code the user may be introduced into the live conference call as the person to whom the email invitation was sent to.

Said system application may use the data channel on the mobile device for voice and text communications. Data channel may use either wireless network (Wi-Fi) connection or cellular data network connection depending on quality of better available network connection at any given time. The application on the mobile device can determine in real-time whether to use Wi-Fi or cellular data for transmitting call content to the other participants of the conference call. The ability of the application to move seamlessly between Wi-Fi sites and cellular data towers without call interruption may provide seamless end to end call connectivity for all conference call participants. A unique attribute of the system is that the call can transition an unlimited number of times between Wi-Fi/cellular data and the voice call can continue without any interruption.

Likewise, said operations may permit a call participant to transfer their current call from the app on the mobile device to a traditional phone number seamlessly. Further, said operations may allow a call organizer to manage and conduct two conference calls simultaneously. Said operations also allow a call organizer to transfer call organizer capabilities to another call participant in real-time such that many controls may be transferred from an existing call organizer to a new call organizer.

Said operations comprise enabling a user to start a chat session and engage in said chat session during a conference call or not during a conference call, enabling a user to view status of participants of a conference call in real time, enabling a user to view status of a participant of a chat session during a conference call or not in a conference call in real time, enabling a user to view real time data pertaining to a participant of a conference call, enabling a user to view real time status of multiple conference calls, enabling a participant to join a call, enabling a user to view a calendar to enable a user to identify the date and time of a call, enabling a user to view details, including date, time, duration, and participants, of a conference call in real time, enabling a user to schedule a call, enabling a user to connect a user to a call during a call in progress, enabling a user to dial a participant using a touch screen number pad, enabling a participant to share media files with another participant in real time, enabling a user to take a photograph and share said photograph with at least one other participant, and enabling a user to call, during said call, a participant who loses connection to a call.

The aforementioned operations require complex operations performed by a processing device on a mobile phone device. Sharing of audio and photographic file data may require dependence on a microphone, speaker, touch screen, and a camera on a mobile phone device. The processing device on the mobile phone device enables the operations and features of the claimed system and method.

The claimed system and method include a conference call application. Current providers of conference call features charge a burdensome expense on users. The claimed application helps users take advantage of unforeseen improvements in the industry. Up to dozens of customers may use said application. Customers pay a low monthly or quarterly or semi-annual flat fee for using said application.

The claimed system and method may enable a user to choose participants for a conference call and call said participants while in a conference call. The system and method may allow sharing of one or more video files. The disclosed system and method may allow the archiving and recording of audio produced during a conference call. Notably the disclosed system may use an on-net data channel as opposed to limiting itself to traditional telephonic connectivity.

The disclosed system and method may comprise a directory which a user may search in order to retrieve the directory content. The disclosed system and method may also permit exchanging file data from mobile phone to mobile phone. One or more different types of media can contain said file data. Another novel part of the claimed system and method is the auto-redial feature which may be helpful when a participant drops from a conference call, the claimed system and method may permit a user to dial the dropped participant allowing the dropped participant to re-join the conference call. The claimed system and method may reduce the currently-present friction associated with managing multiple conference calls. The application using the disclosed invention may be available on several interfaces such as an iPhone®, Android® devices and the like.

FIG. 1 represents an interface 100 showing a list of potential call participants organized into contacts, groups and favorites. The interface 100 may depict a header 106 and a logo 102. Further, the interface 100 may display a listing of potential participants, wherein the potential participants may be organized into a groups tab 110, a favorites tab 112, and a contacts tab 118.

Via a search option 108, a user may search a person, a phone number, an email address or other similar information in the groups tab 110, the favorites tab 112, and the contacts tab 118. By selecting option 104A, a user may alphabetically sort the groups displayed in the groups tab 110, the favorites displayed in the favorites tab 112 and the contacts displayed in the contacts tab 118. Additionally, as shown on the interface 100, a user may manually initiate a call, initiate a conference call or start a secure chat by selecting a keyboard option 120, a conference call option 122 and a secure chat option 124 respectively.

A user may select a call participant(s) from the groups tab 110, the favorites tab 112, and the contacts tab 118. According to one embodiment of the disclosed invention the names in the group list, the favorites list, and the contacts list may be imported from the address book of the user's mobile device. A green icon 128 may indicate that the participant is on-line, for example, in FIG. 1, Andrew Parker and Livia Nelson appear to be online. However, red icon 126 may indicate that the participant may be off-line, as seen from FIG. 1, Jason Bleck appears to be offline. In one embodiment of the disclosed invention, each potential participant may optionally select a digital avatar as well.

Figure 2:
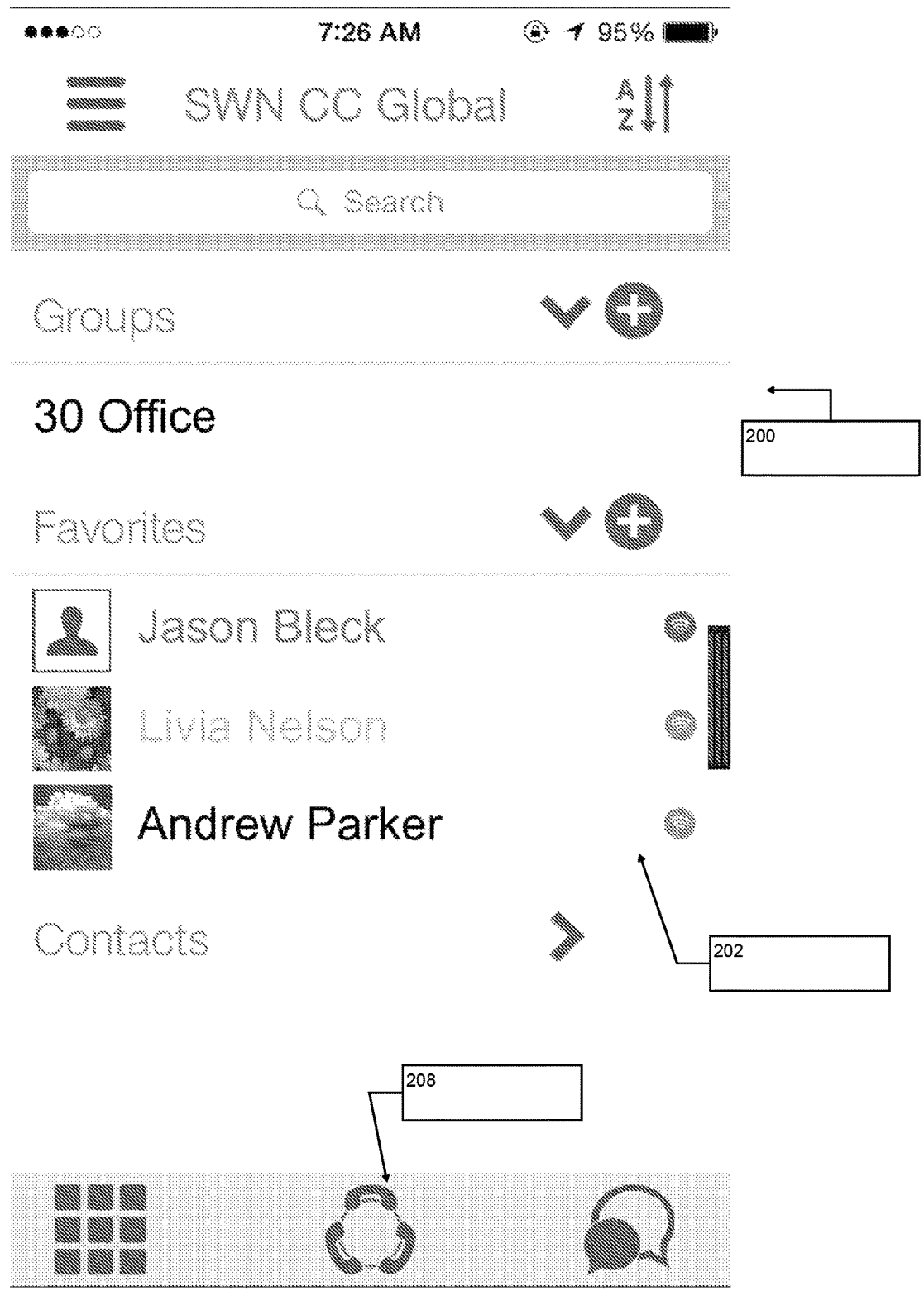
FIG. 2 represents the ability of a user to start a conference call.

FIG. 2 represents the ability of a user to start a conference call. In particular, FIG. 2 depicts an interface 200 resulting from a user selecting the conference call option 122 on the interface 100 shown in FIG. 1. The interface 200 indicates a display area 202, where a user may start a conference call by selecting at least one group or at least one favorites on the interface 200. A user may then select a start conference call option 208 and may optionally record the conference call by selecting a record call option, not shown in FIG. 2, for the conference call to identify the conference call for the recording purposes.

Figure 3:
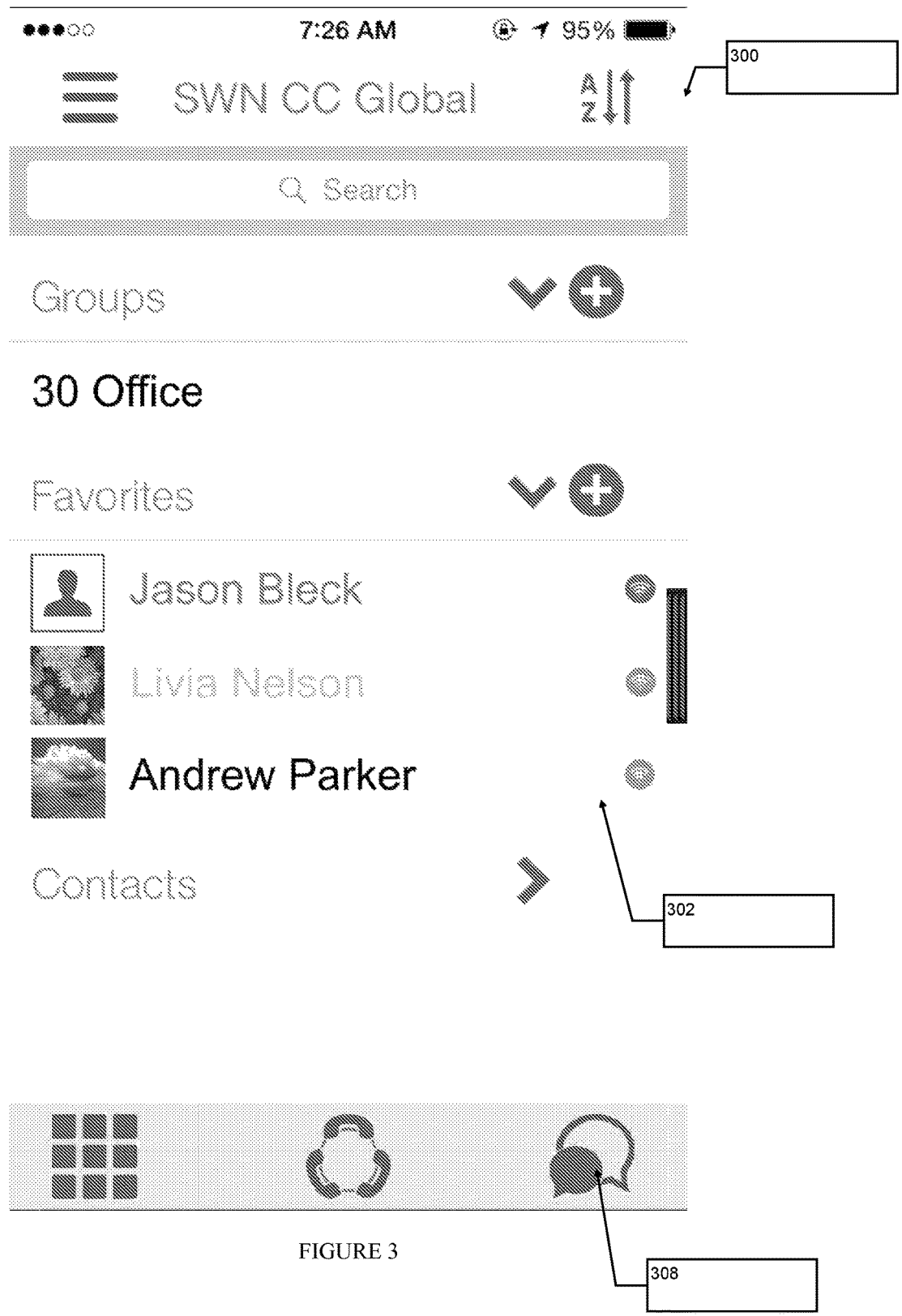
FIG. 3 represents the ability of a user to start a chat.

FIG. 3 displays the ability of a user to start a chat. FIG. 3 depicts an interface 300 resulting from a user selecting the secure chat option 124 on the interface 100 shown in FIG. 1. The interface 300 indicates a display area 302, where a user may select at least one group or at least one favorites on the interface 300. A user may then start a secure chat with the selected group or favorites by selecting a start secure chat option 308 after optionally specifying a name for the chat.

Figure 4:
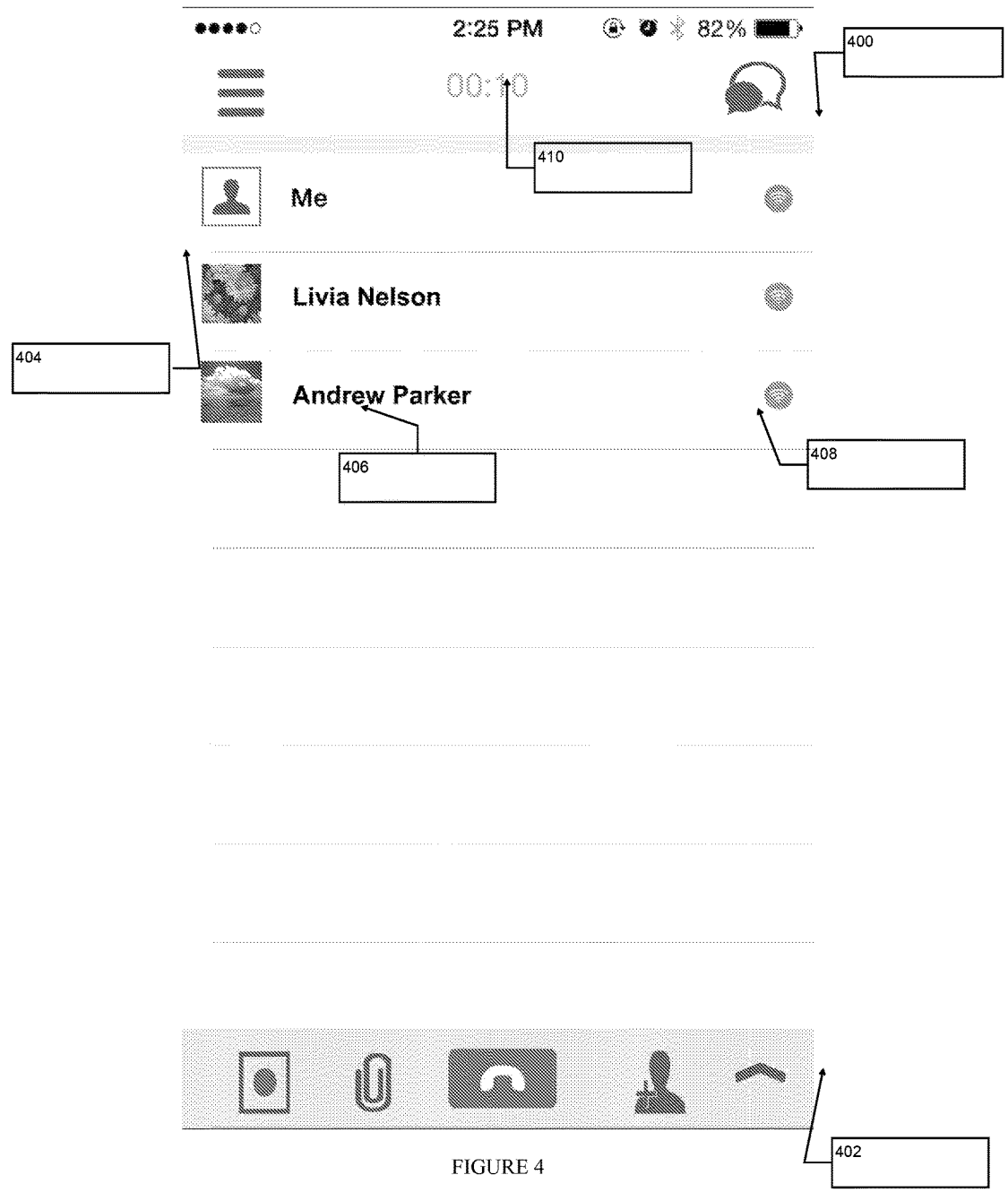
FIG. 4 illustrates a list of all participants in a particular conference call.

FIG. 4 illustrates a list of all participants in a particular conference call. FIG. 4 displays an interface 400 resulting from a user selecting the conference call option 122 on the interface 100 shown in FIG. 1. The interface 400 indicates a display area 402, where a user may select a record chat option, send attachment option, add user to the chat option, file upload option, and the like. As seen on the interface 400 upon selecting chat option, the chat information 404 is displayed on the interface 400. The chat information 404 may comprise information pertaining to the participant identification 406, participant connectivity status 408, chat duration 410 and the like.

The names of the participants 406 along with an avatar of each call participant may also be displayed on the interface 400. The status 406 may be indicated in different colors to show whether a participant, in the process of establishing a communication link with the caller, is connected, cannot be reached, or disconnected. For example, green status indicator may indicate that the participant is connected, yellow may imply that the participant cannot be reached or is busy, and the red may indicate that the participant is disconnected.

Notably, status of a given participant may be updated dynamically in the real time, and can be viewed by all the participants to the conference call. In one embodiment of the disclosed invention, only a conference call initiating party may be able to view the connection status of the given participant. In another embodiment of the disclosed invention, the system may detect a participant being disconnected from an ongoing call and automatically redial the number of the disconnected participant and optionally present a visual indication of the automatic redial to the call initiating party.

Figure 5:
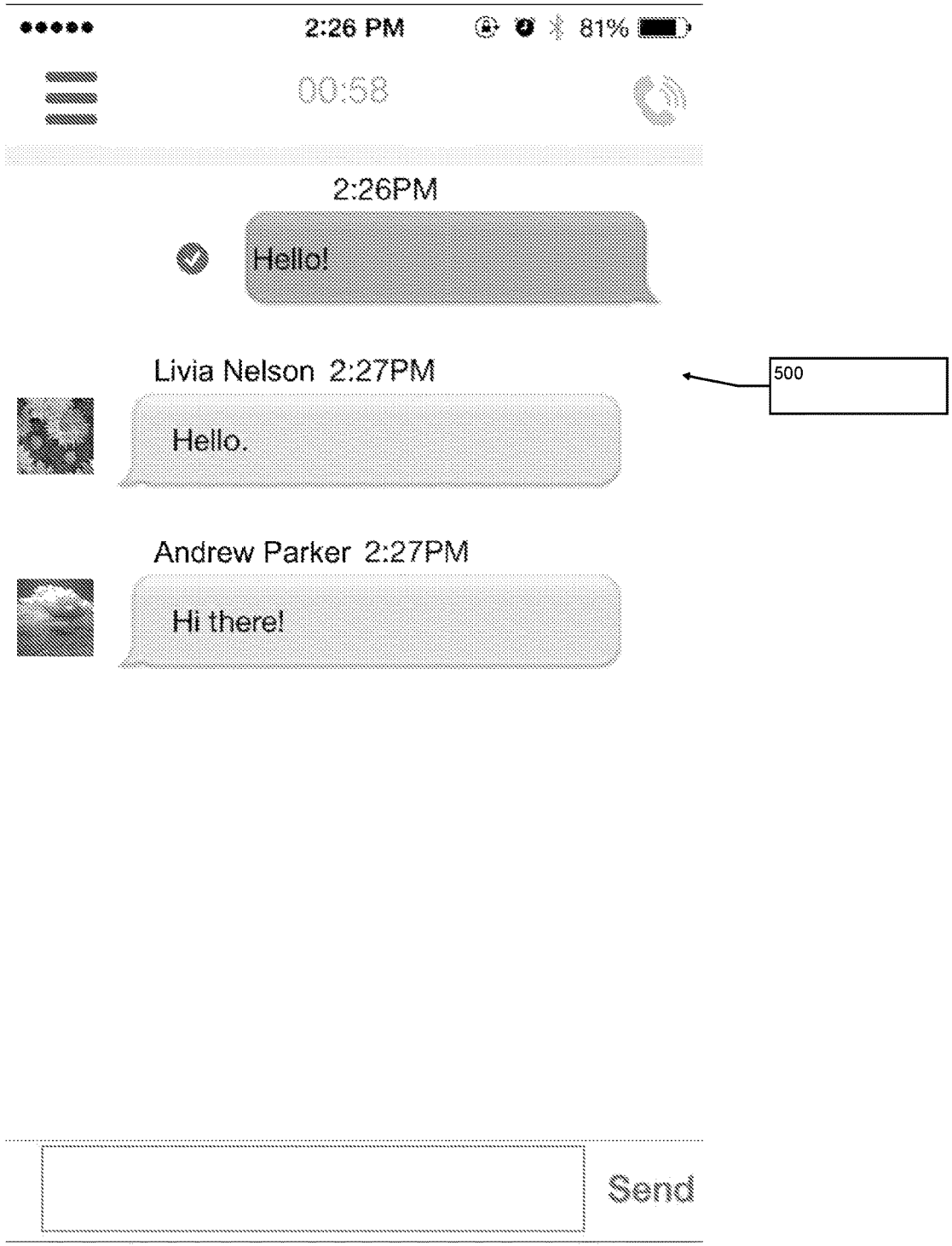
FIG. 5 illustrates a chat session between participants of a conference call.
Figure 6:
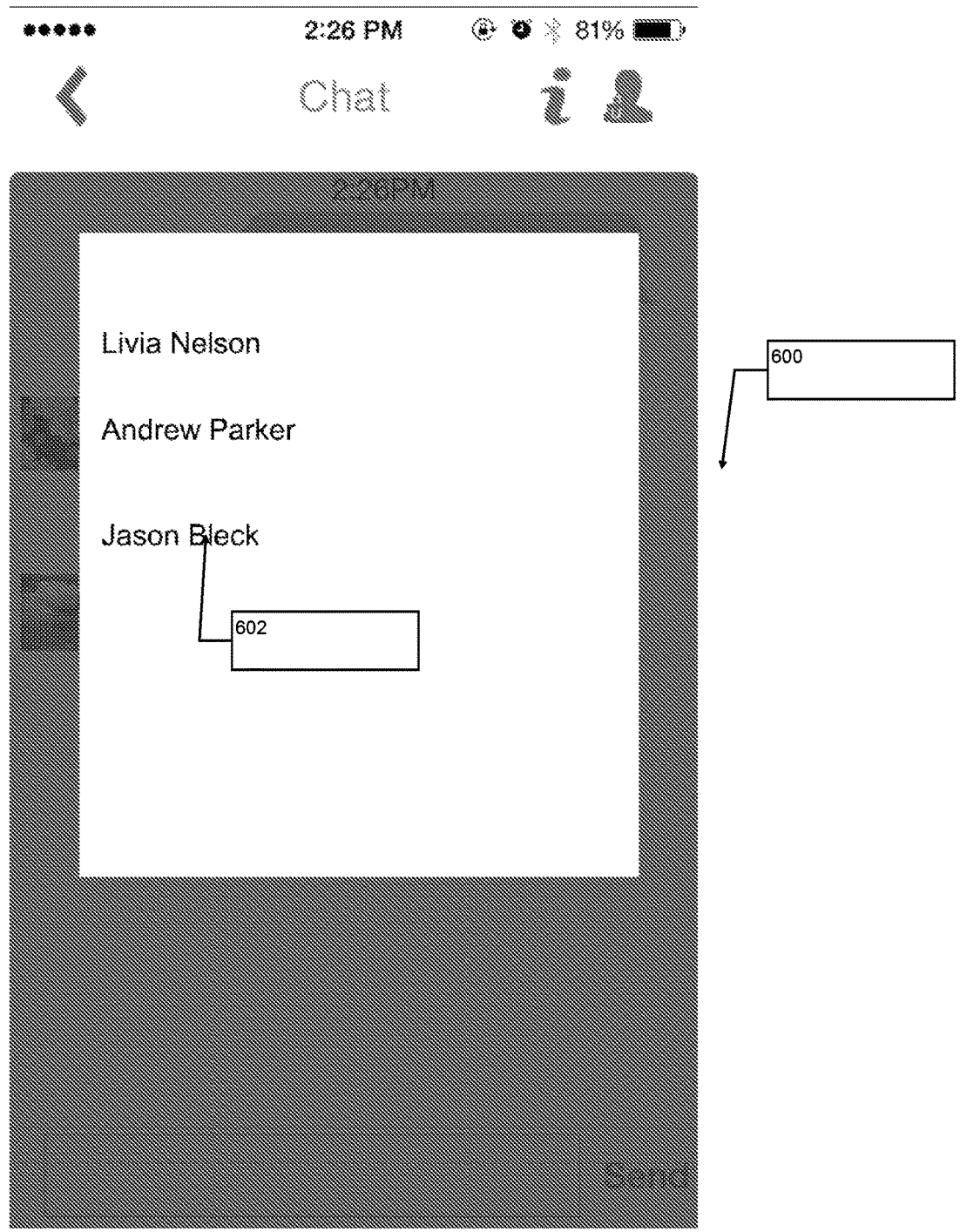
FIG. 6 represents a list of participants in a chat session.

FIG. 5 illustrates interface 500 showing a chat session between participants of a conference call. FIG. 6 represents interface 600 showing a list of call participants in a chat session. For example, a list of names of the participants in a chat session 602 and optionally a connectivity indicator of each participant in the chat session, not shown in FIG. 6 may be displayed on the interface 600.

Figure 7:
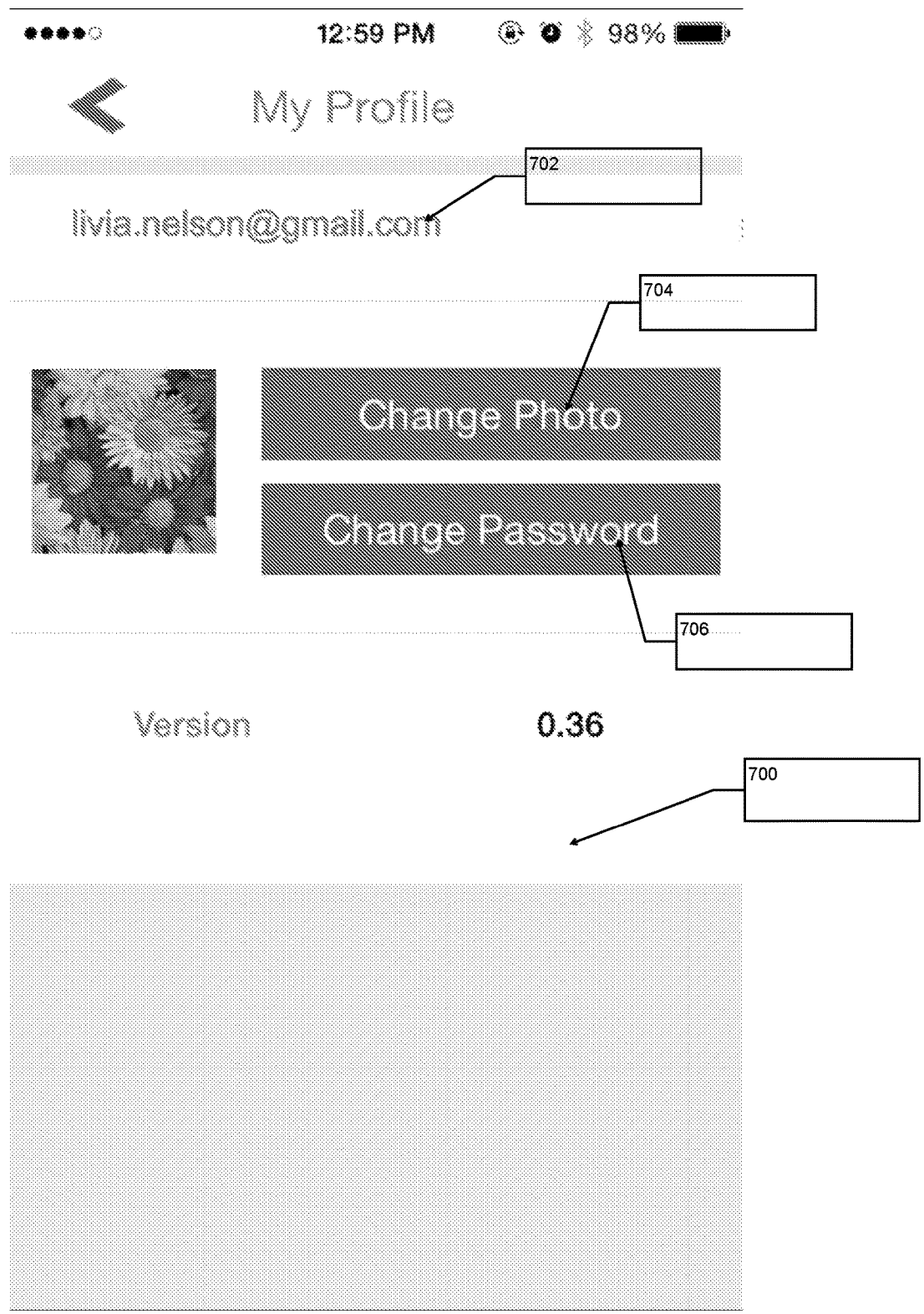
FIG. 7 represents a display of profile information of a contact.

FIG. 7 represents interface 700 displayed upon participant selecting to view and optionally change the participant profile. The participant email 702 may be displayed on the interface 700. The interface 700 may display options for the participant such as a change phone number option 704, change password option 706 and the like. A grid area on the interface 700 may display a send logs option, not shown in FIG. 700. The send logs option may be displayed when a user selects a version number option, also not displayed in FIG. 7. This send logs option may be used for returning diagnostic information by the disclosed system.

Figure 8:
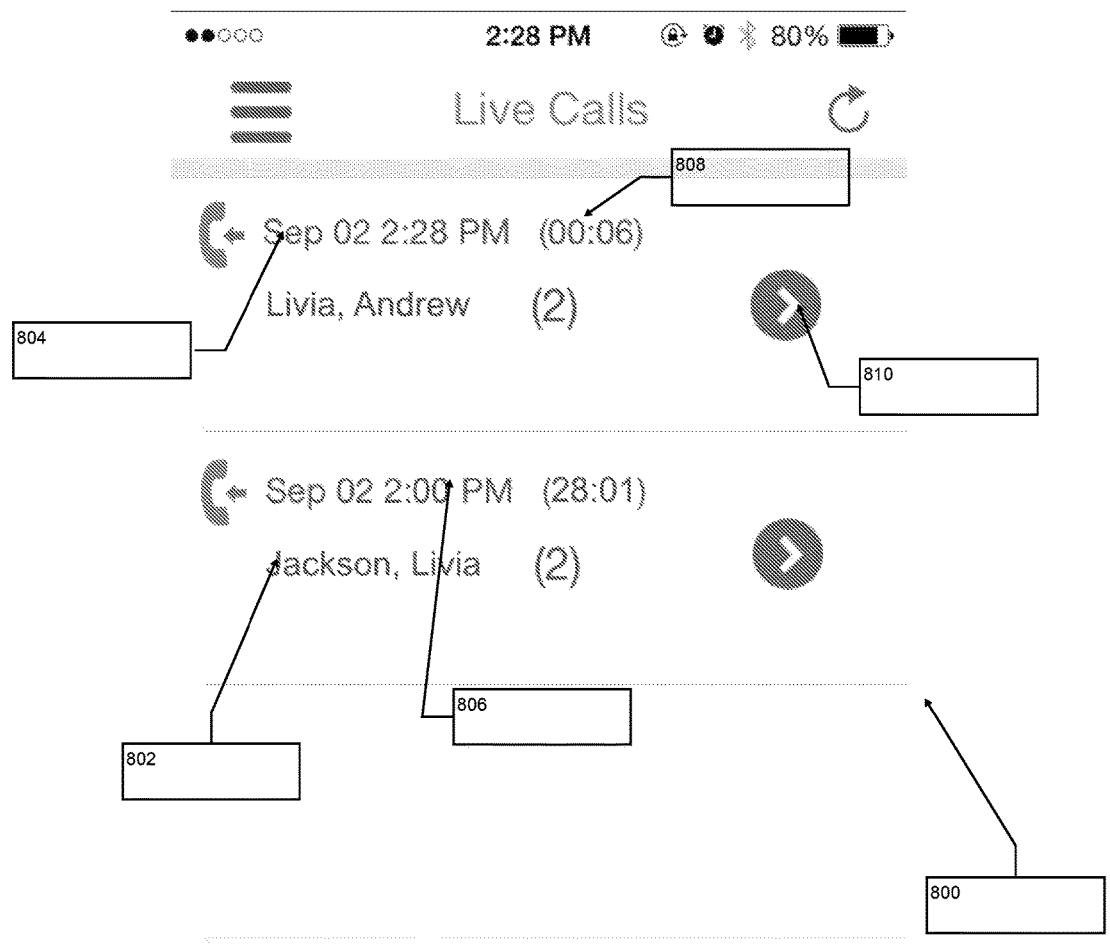
FIG. 8 represents a list of live calls and details pertaining to each live call.
Figure 9:
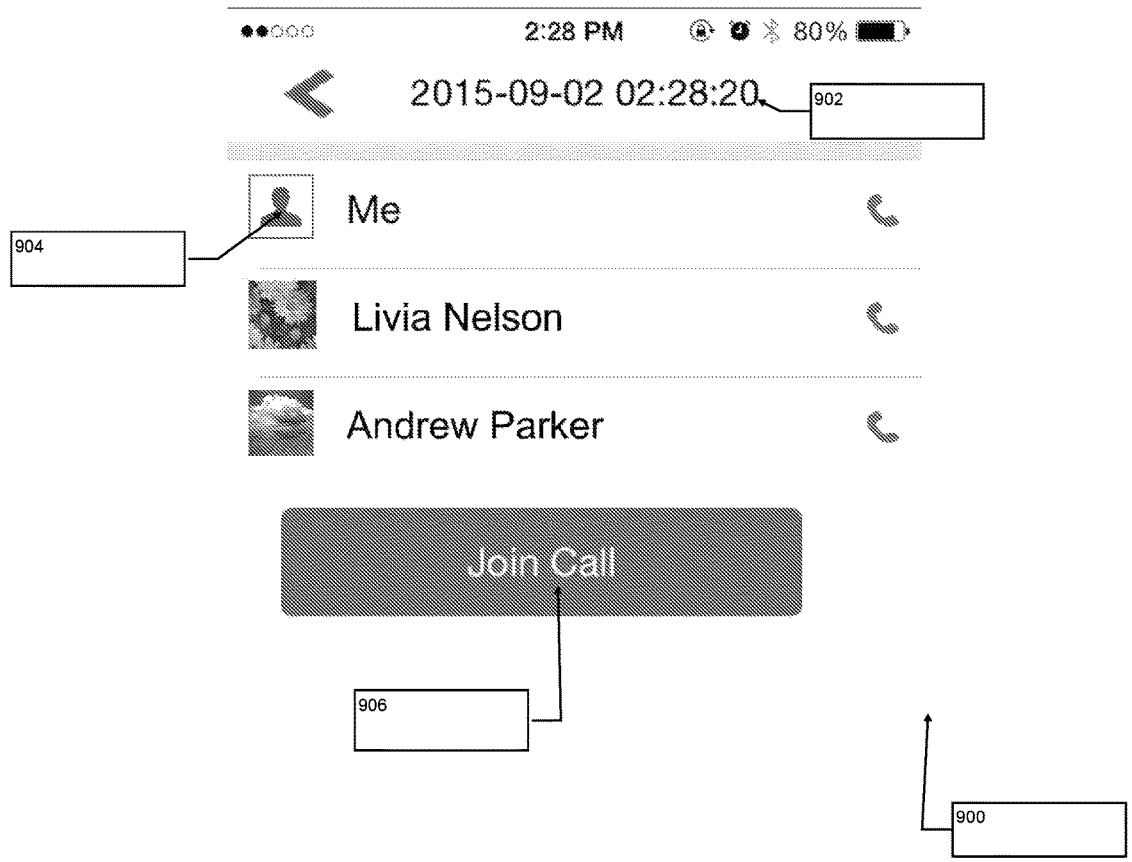
FIG. 9 represents detail information about a particular call selected by a user from list of the live calls shown in FIG. 8.

FIG. 8 represents interface 800 displaying a list of live calls 802 that are currently taking place as the interface 800 is being displayed. For each live call the interface 800 may display a set of participant names 802, a call date 804, a call time 806, call duration 808 and call details display option 810. Interface 900 shown in FIG. 9 is displayed when call details display option 810 is selected. In other words, interface 900 is displayed when a user selects to view additional details about a particular call from the list of live calls.

Turning now to FIG. 9, where the interface 900 represents information pertaining to a selected call, for example a call identification number 902, names of the call participants 904, and the like. By selecting a join call option 906, a user can join the selected call.

Figure 10:
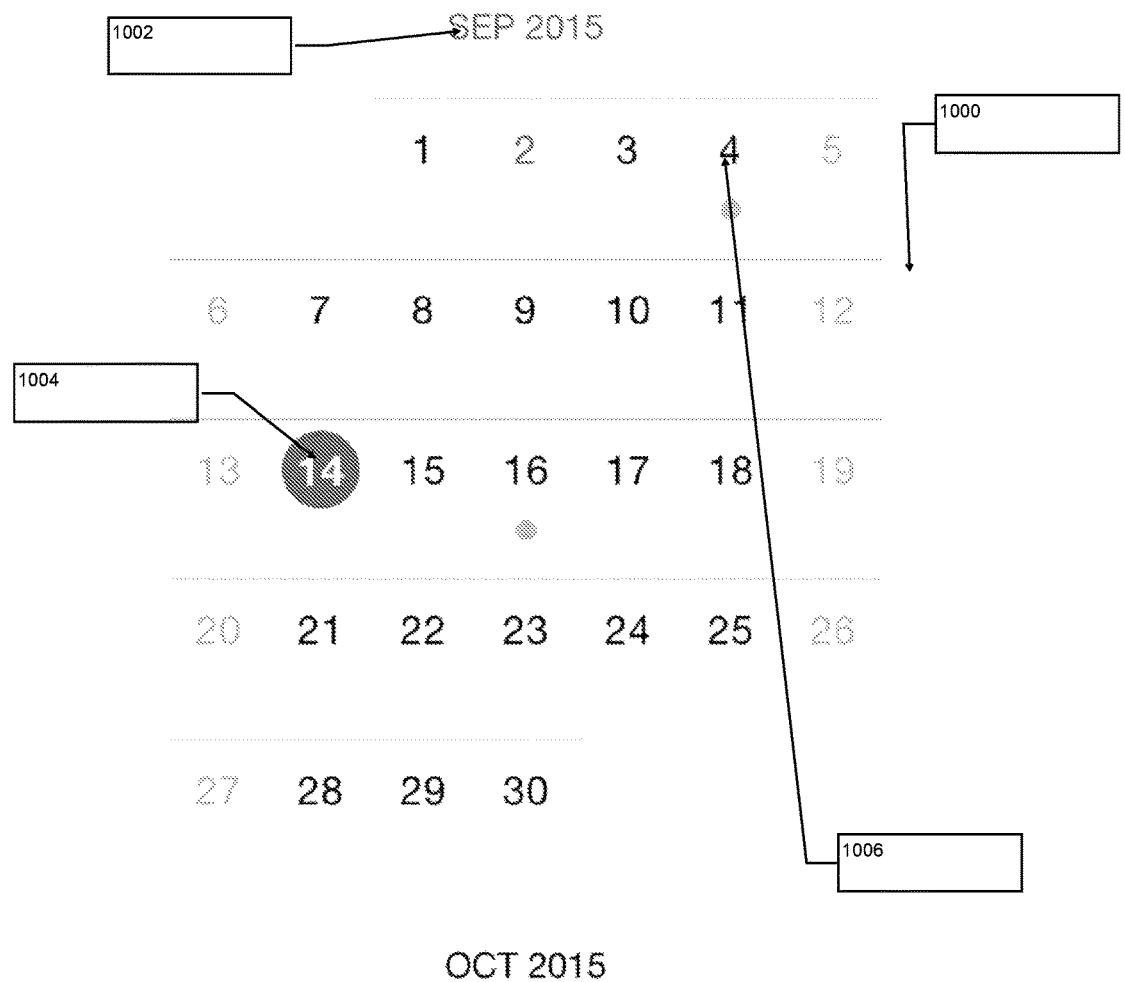
FIG. 10 demonstrates a calendar view reflecting the current conference call schedule.
Figure 11:
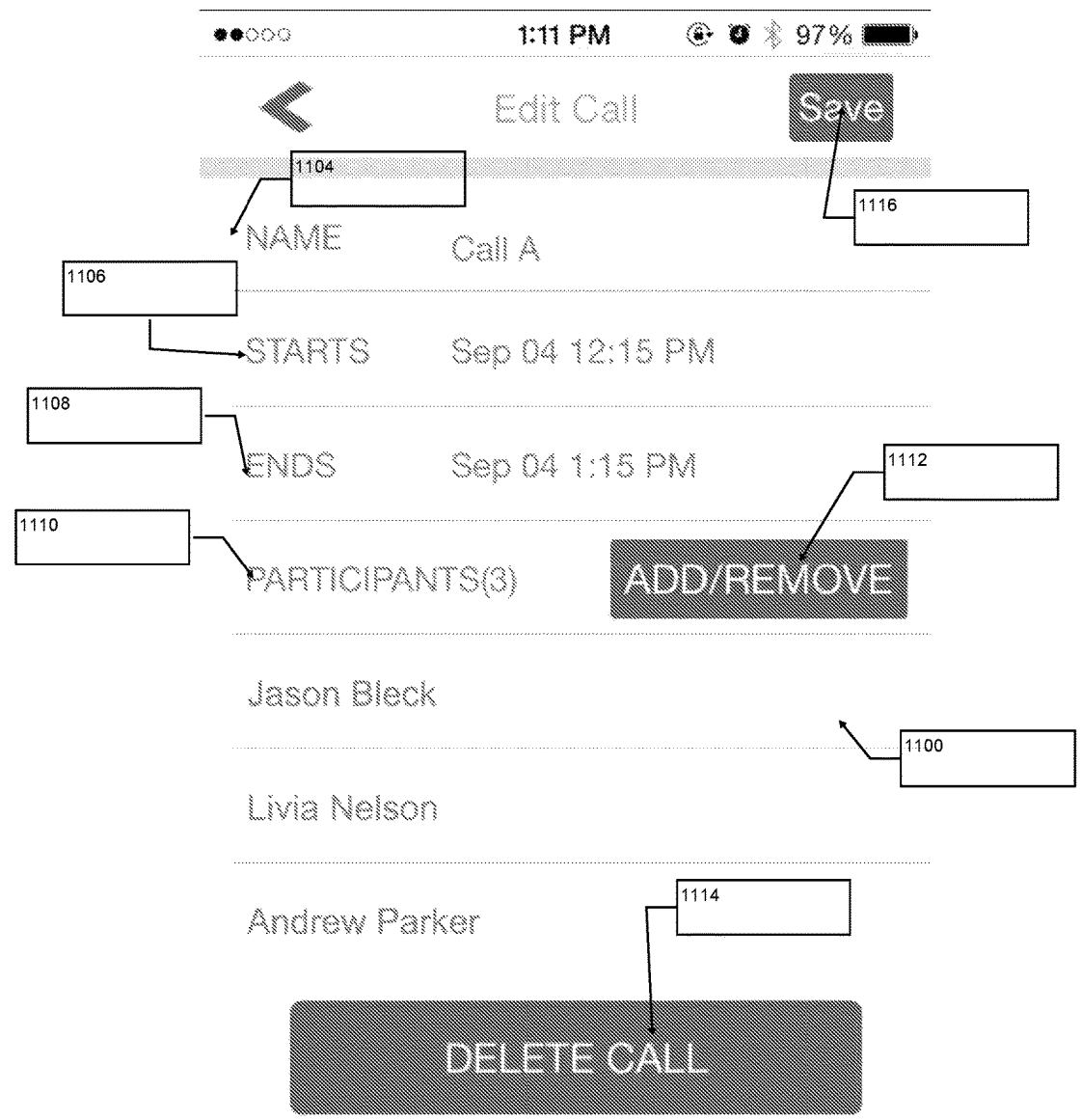
FIGS. 11-13 demonstrate calendar feature of an embodiment of the disclosed invention via an edit call interface 1100, an add call interface 1200, and a dashboard interface 1300 respectively.
Figure 12:
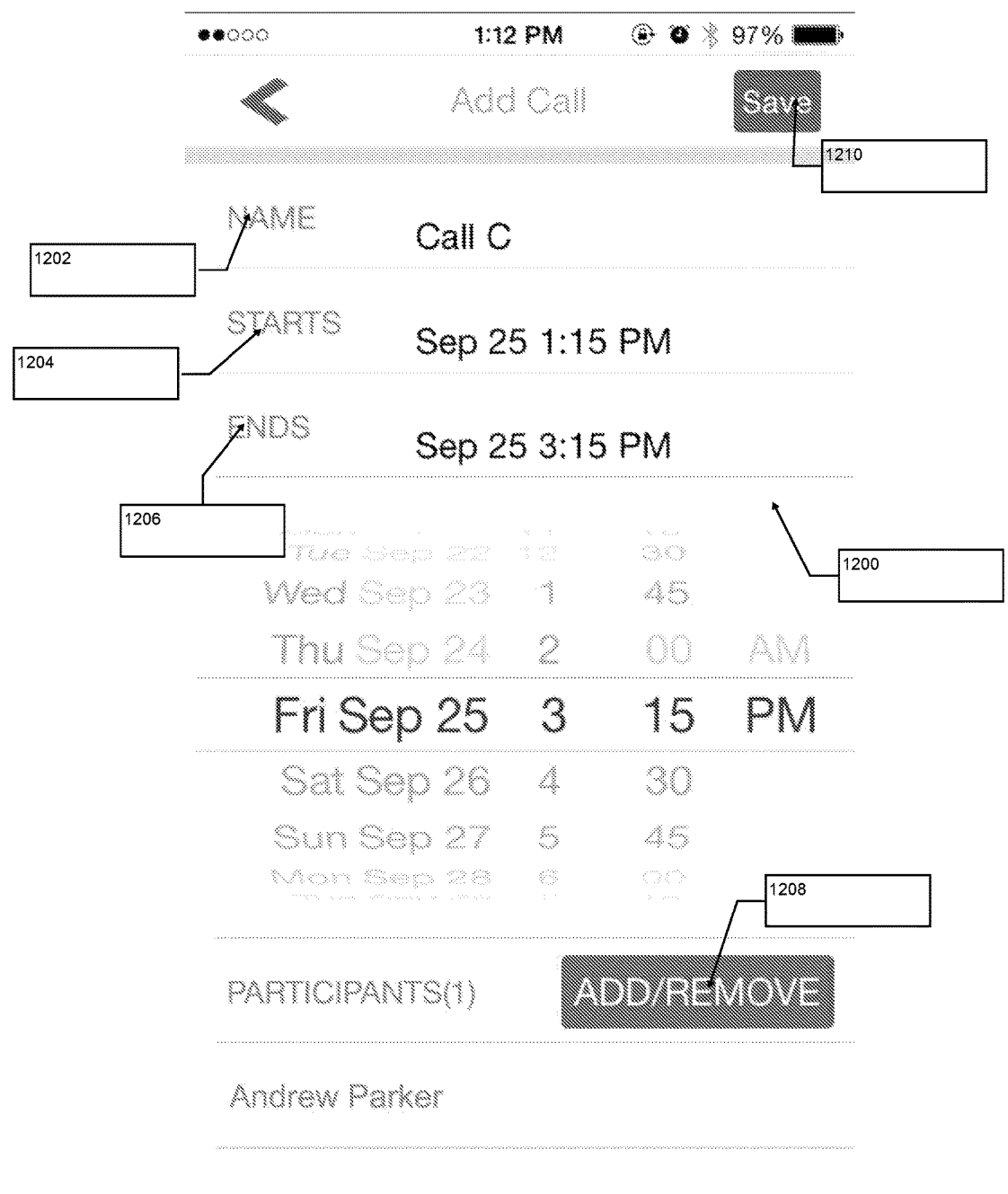

FIGS. 10-12 demonstrate a calendar feature which allows a user to schedule a future conference call. In FIG. 10, an interface 1000 shows a calendar view reflecting the current conference call schedule. The interface 1000 may indicate a month 1002 showing days of the month, wherein the days on which a conference call is scheduled, for example date Sep. 14, 2015 indicated by the reference numeral 1004, maybe marked by a special indicator. The special indicator may be shown by underlining the date, using the boldface font to indicate the date, and the like. Upon a user selecting a specific day, a list of calls 1006 that are scheduled on the selected day is displayed on the interface 1100. Now turning to FIG. 11.

Referring now to FIG. 11, showing an edit call interface 1100 shows the call details of a specific call selected by a user. The call details may comprise a name of the call 1104, a date and starting time of the call 1106, an ending time of the call 1108, and a list of names of the call participants 1110. A user may, by selecting option/add remove participants 1112, add or delete the participants from the call. After making the changes i.e. after adding or deleting the participants, a user may select a save changes option 1116 to save the previously made changes to the list of call participants. A user may select to delete call by selecting the delete call option 1114 on the interface 1100.

Turning now to FIG. 12 showing an add call interface 1200 of the disclosed invention. As described above, a user may schedule a new call to a selected day of the displayed month by selecting a specific day. For example, a user may, via interface 1200 select an event name 1202, an event date and start time 1204, an event end time 1206 for a call a user is seeking to add. Additionally, a user may add or remove participants by selecting option 1208. A user may select a save option 1210 to save the changes made via the interface 1200.

Figure 13:
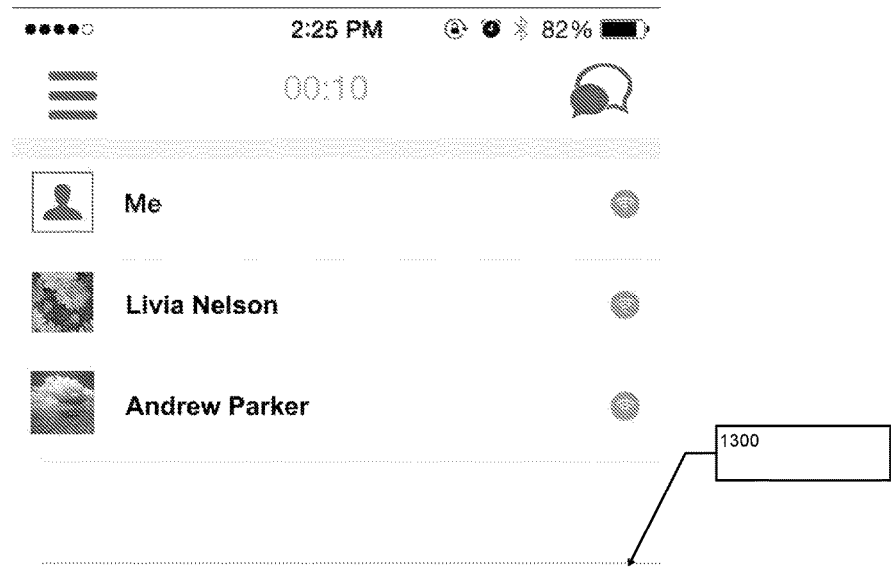
Figure 13:
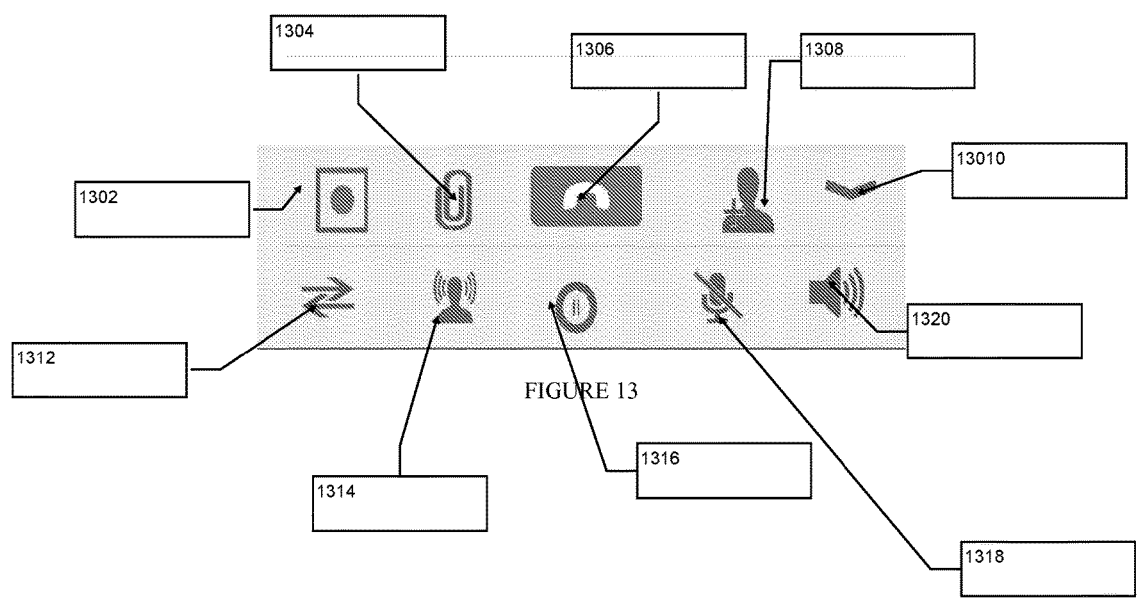
Figure 14:
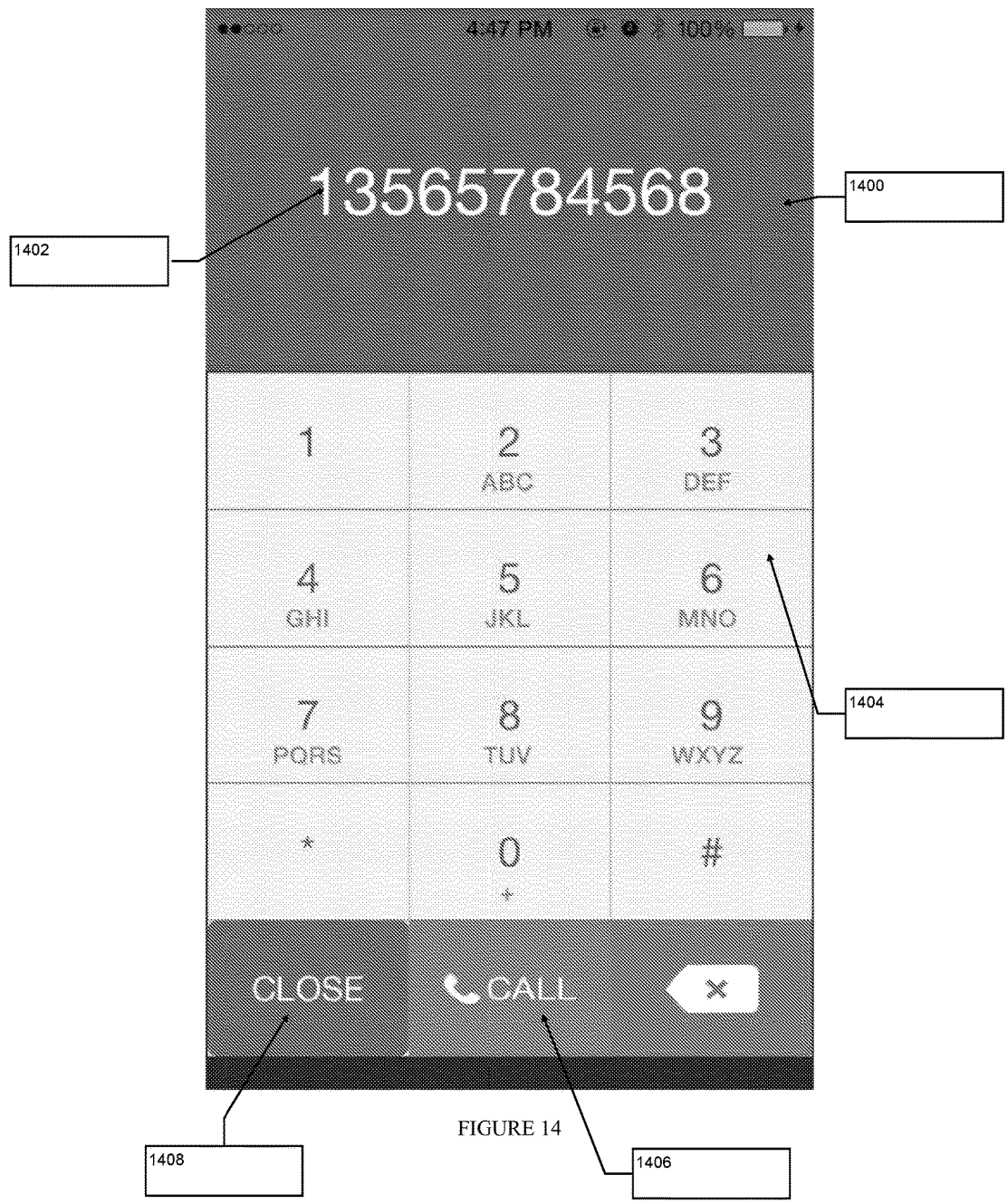
FIG. 14 displays a dashboard interface available to a user while conducting a conference call.

FIG. 13 displays several options of a dashboard that are available to a user while conducting a conference call. A record option 1302 is a record icon can be used to record the conference call. An attach file option 1304 can be used to attach files while in the conference call. A hang up call option 1306 can be used to disconnect the conference call, and an add participant option 1308 can be used to add another participant to the conference call. FIG. 14 shows interface 1400 which is displayed upon selecting the add participant option 1308.

Further, a collapse/expand icon 1310 can be used for showing or hiding the menu options in order to preserve screen real estate Additionally and alternatively the user may switch the control of the conference from the call organizer to another participant via a swap control option show in icon 1312. An exclusive control option 1314 may be used to indicate that only the call organizer may speak while this option is selected. By selecting a pause call icon 1316, a user may halt the ongoing conference call. A user may mute the call via a mute option 1318 and place the call on speaker by selecting a speaker option 1320.

Figure 15:
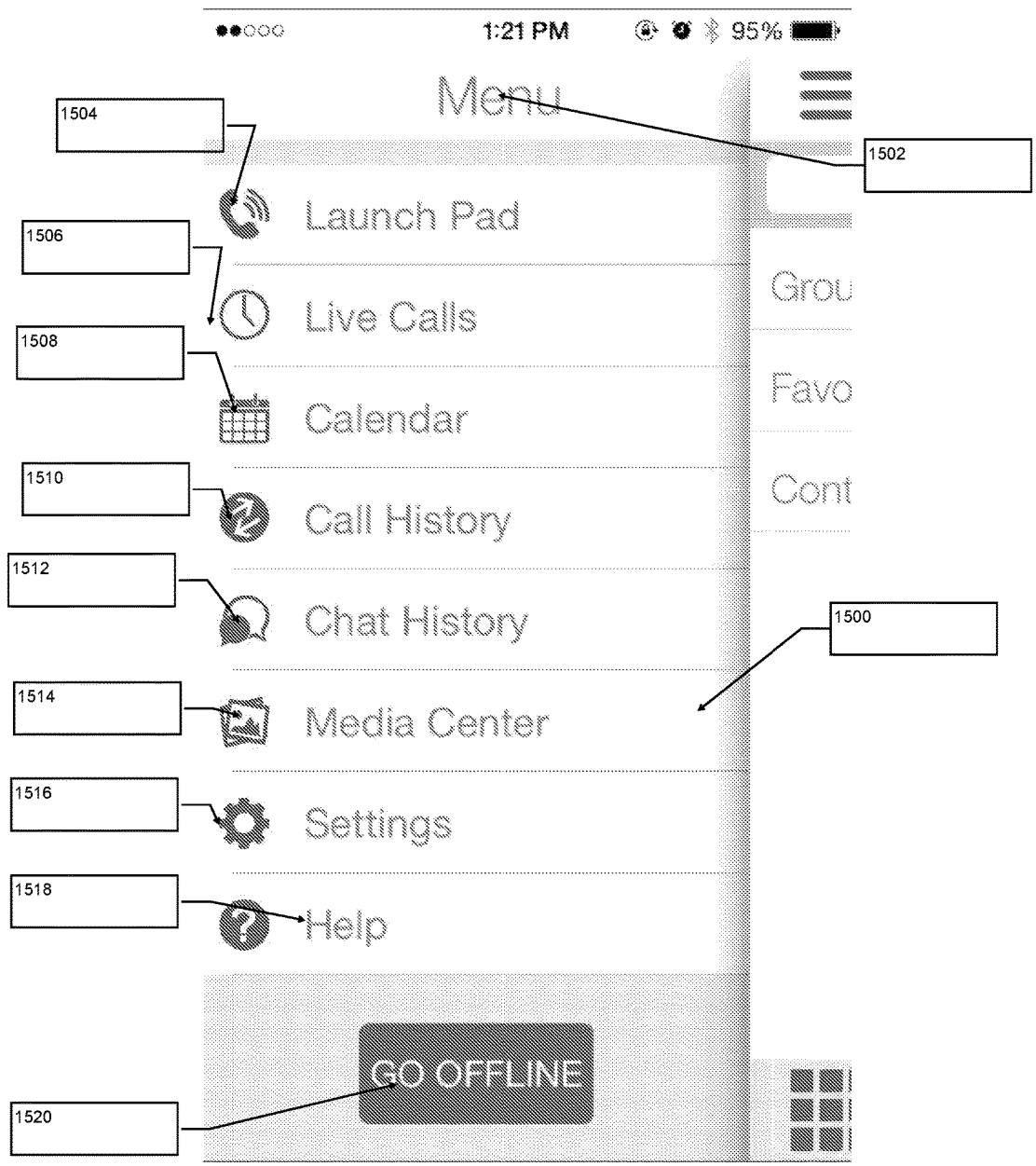
FIG. 15 displays a menu interface showing a home screen menu displaying several options to a user.

FIG. 14 shows interface 1400 which is displayed upon selecting the add participant option 1308 in FIG. 14. In other words, FIG. 14 demonstrates how a user can dial a number of a recipient in order to add the recipient to a call or forward a call to a user available at dialed number. FIG. 15 shows an interface 1400 wherein, a user can dial a number 1402 via a keypad 1404 and select a dial option 1406 to dial the number 1402. Alternatively, a user may abort the attempt of adding a new recipient by selecting a close option 1408. User may return to interface 1300 upon selecting the close option 1408.

FIG. 15 displays an interface 1500 showing a home screen menu displaying several options to a user. The claimed system and method prompt a user to indicate whether said user wishes to import contacts from the device into the application. The claimed system and method allows a user to send a conference call invitation to an on-device contact.

FIG. 15 also features a menu 1502 listing several options for the user on the interface 1500. For example, by selecting a launch pad option 1504 which may allow a user to transition to a screen to originate a real-time conference call. Similarly, after selecting a live calls option 1506 the system may display a listing of active conference calls. An active conference call includes a call which has featured an invitation to a user. In case a user gets disconnected from an ongoing conference call, said user may select the live calls option 1506 to return to a call if either the user has declined an earlier call invitation or if an auto recall option has been deselected by the call originator.

In one embodiment of the disclosed invention, the auto recall option may be implemented by a radio button, not shown in FIG. 15, whereby a call originator may selectively turn the auto select option on or off. The user may select a calendar option 1508 to either review the current call schedule or to schedule a future call. Upon selecting a call history option 1510 the claimed system and method cause display a log of all outbound calls a user has made in the recent past or all inbound calls received by the user. Additionally, this option may enable a user to reconstitute a call in case said user wanted to restart a preexisting call.

After selecting a chat history option 1512 the claimed system and method may display a log of all chat conversations the user was engaged in comprising outbound chat for which the user may have sent chat invitations or inbound chat conversations in which the user has received chat invitations. The chat history option 1512 may enable a user to reconstitute a chat in case said user wanted to restart a preexisting chat session. The media center option 1514 may enable a user to exchange file data from a phone.

Using this option, a conference call organizer may exchange file data with other participants of the call. As users exchange media files, the claimed system and method may cause to store the media files in a media center. An interface 1900 shown in FIG. 19 may be displayed upon a user selecting the media center option 1514. A user may configure settings for the disclosed application via a settings option 1516. Additionally, and alternatively, a user may select help option 1518 to view help topics or the user may go offline option 1520 to exit from the disclosed application.

Figure 16:
FIG. 16 a directory search interface according to one embodiment of the disclosed invention.
Figure 17:
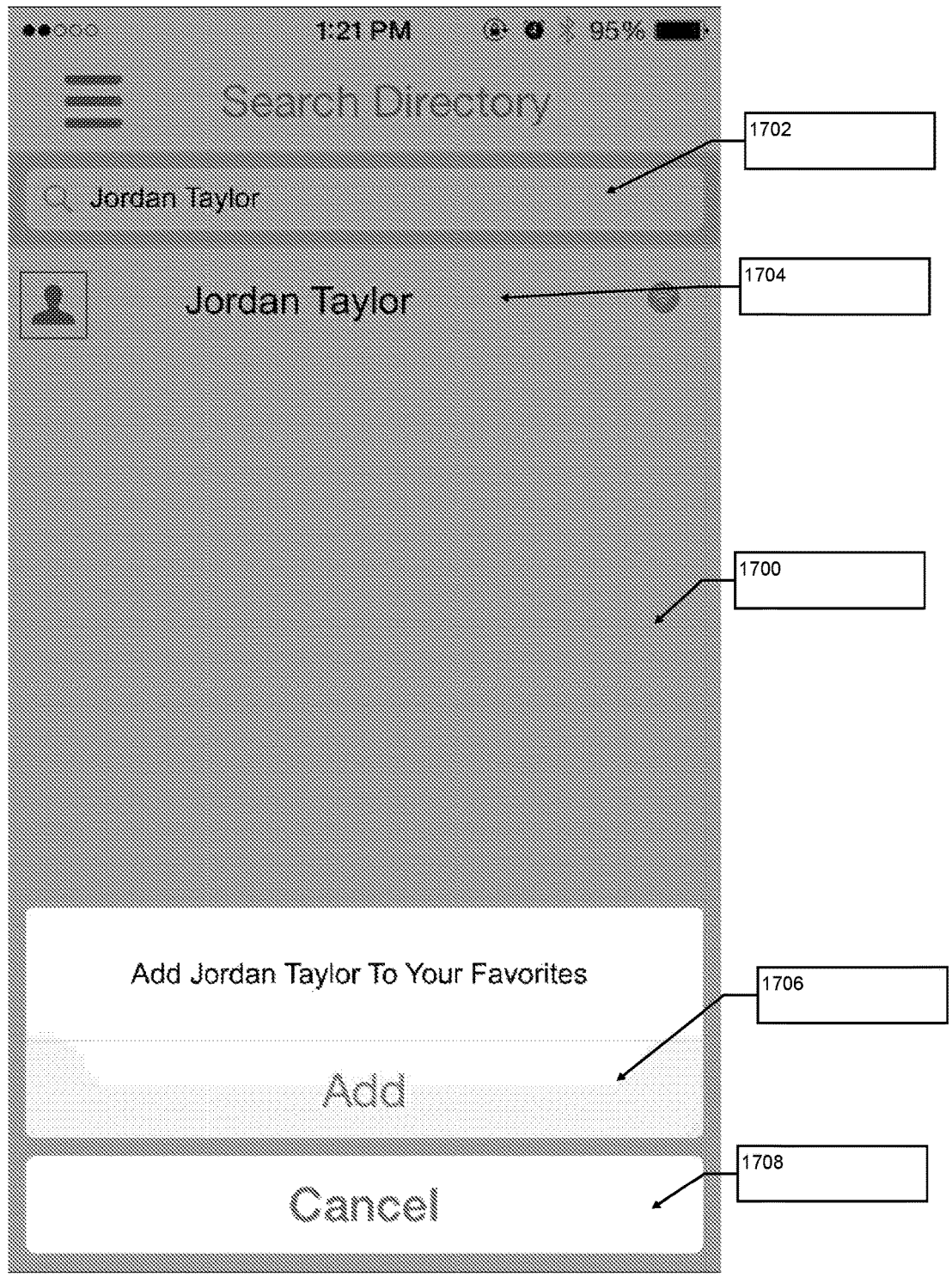
FIG. 17 displays an interface showing a search box whereby a user can search for contacts.
Figure 18:
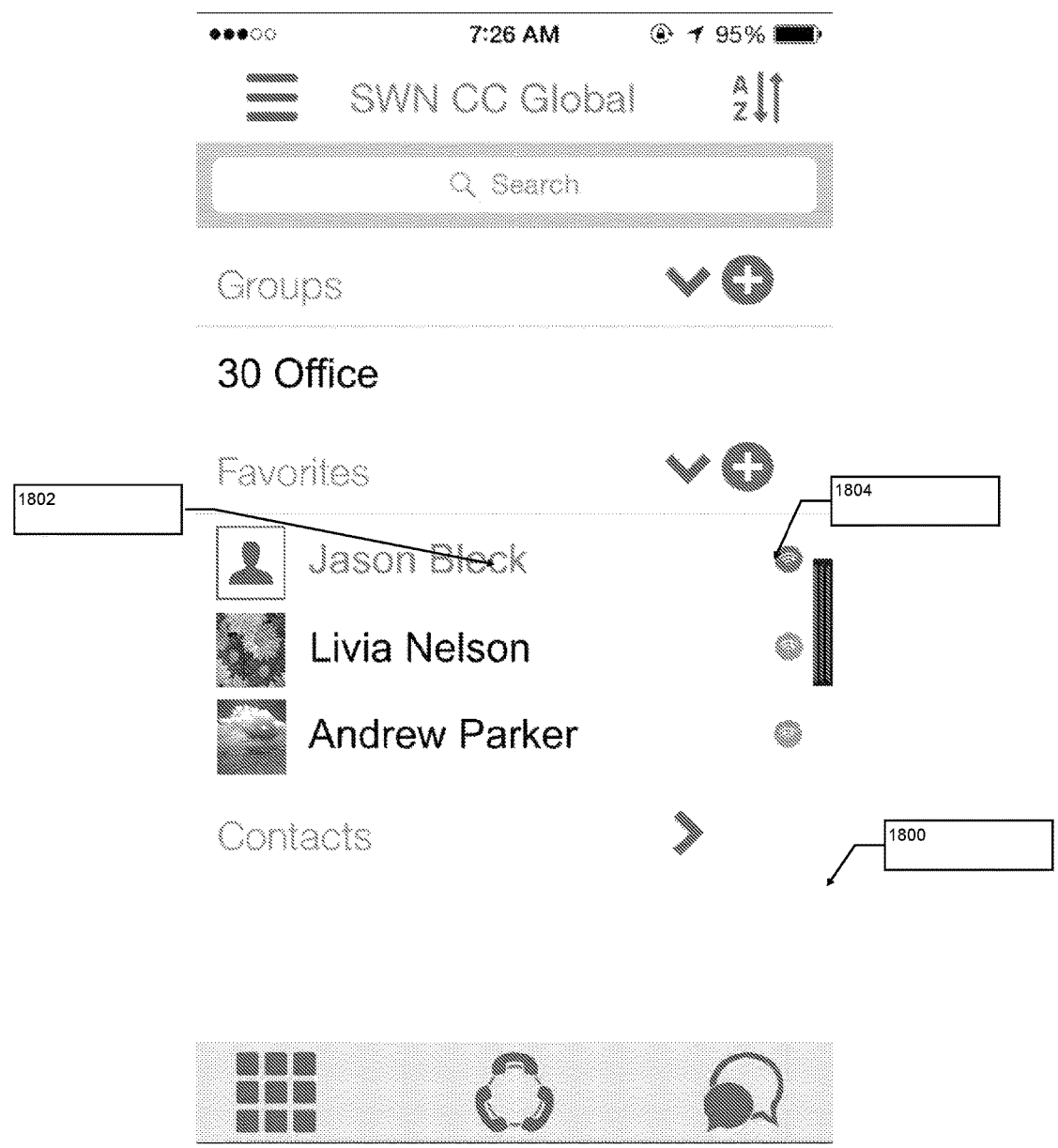
FIG. 18 displays a search result interface displaying a list of contacts in the launch pad.

FIG. 16 indicates a directory search interface 1600 according to the one embodiment of the disclosed invention. A user may access the directory containing names of other users who has the disclosed application installed on their device. This process is indicated in FIGS. 16-18. FIGS. 16 and 17 display a directory which may enables a user to search for contacts who have said application installed on a mobile device. The user can choose whether to place information of said contacts in said directory. Thus, the disclosed system and method may enable a user to search for and add contacts to said directory.

FIG. 16 displays an interface 1600 showing a search box 1602 whereby a user can search for contacts who have said application installed on a mobile device. A user may enter a search criterion in the input area 1602 via keyboard 1604. The disclosed method and system may search for the search term in a search directory containing information about a contact, a group or favorites who have the disclosed application installed on their mobile device. The contact search function is described in further detail in conjunction with FIG. 17 below.

Now turning to FIG. 17, where for example, a search is conducted by providing a string "Jordan Taylor" in the input area 1702 on an interface 1700. The disclosed system and method may conduct a search in the search directory and provide a result 1704 on the interface 1700. The disclosed system may use a contact repository not shown in FIG. 17, to locate the searched contact. The user initiating the search may select to add the searched contact to the user's favorites list by selecting an add option 1706 or alternatively discard the searched information by selecting a cancel option 1708. Accordingly, the application may enable a user to search for and add contacts from the directory.

FIG. 18 indicates a search result interface 1800 displaying a list of contacts in the launch pad, comprising a contact name 1802 and a contact connection status indicator 1804, indicating if the contact indicates is online or offline. In one embodiment of the disclosed invention, an online or a green indication may imply that the contact has installed the application on the contact's device, and the contact is available at the time of the display of said green indication. Conversely, an offline or a red indication may imply that the contact has the application installed on the contact's device but the contact is not available at the time of the display of the red indication.

Figure 19:
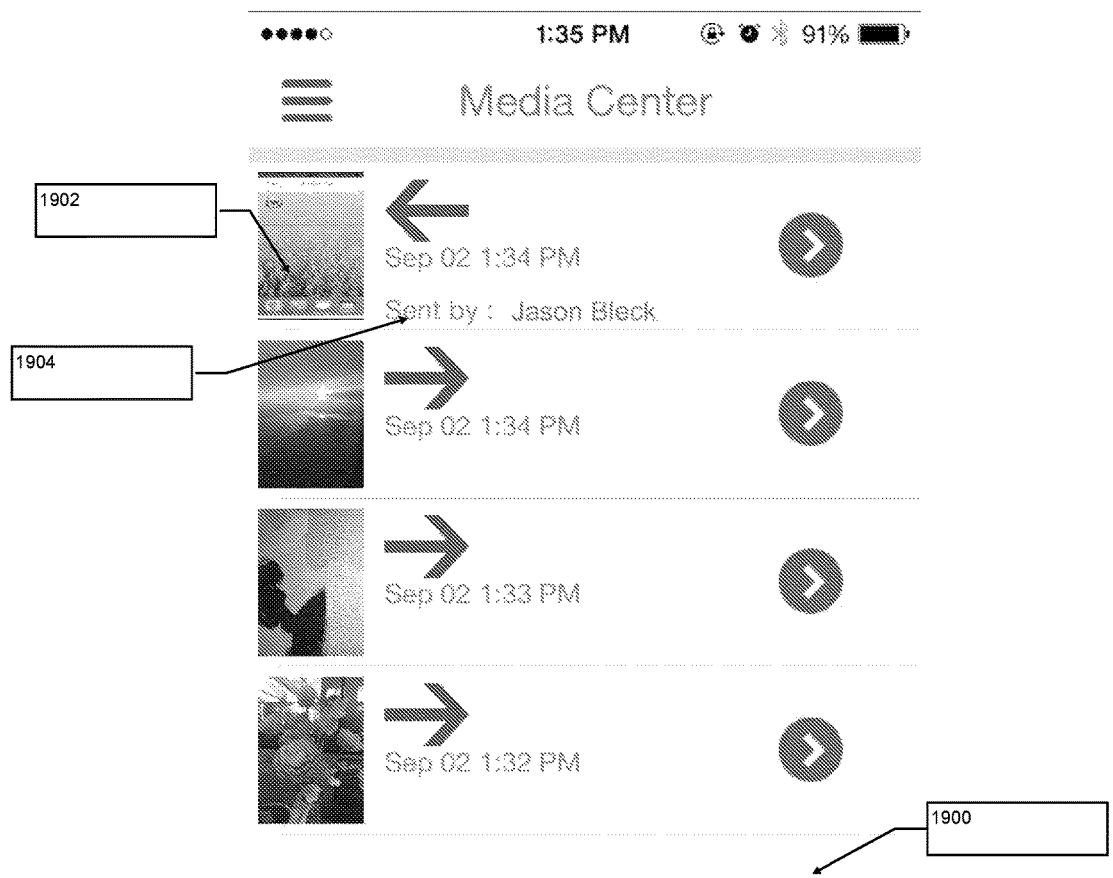
FIG. 19 depicts a media center interface displayed upon a user selecting the media center option 1514 in FIG. 15.

Referring now to FIG. 19 displaying a media center interface 1900 resulting from a user selecting the media center option 1514 in FIG. 15. File data 1902 may comprise media files including but not limited to Blu-ray, CD, DVD, memory stick, USB flash drive, and the like. File data of a user maybe stored in a media center of the user's communication device. File data received from another contact may have sender information 1904 such as sender name, time of dispatch and the like. The received data files may be stored in the media center of the user's communication device. By selecting the media center option a user may exchange file data from the user's communication device. In other words, a user may send file data to another contact by selecting the media center option. Similarly, a user may receive file data from another contact by selecting the media center option and store the received file data in the media center of the user's communication device. Likewise, using the media center option an organizer or a conference call initiating entity may be able to exchange file data with other participants of the conference call during an ongoing conference call.

Figure 20:
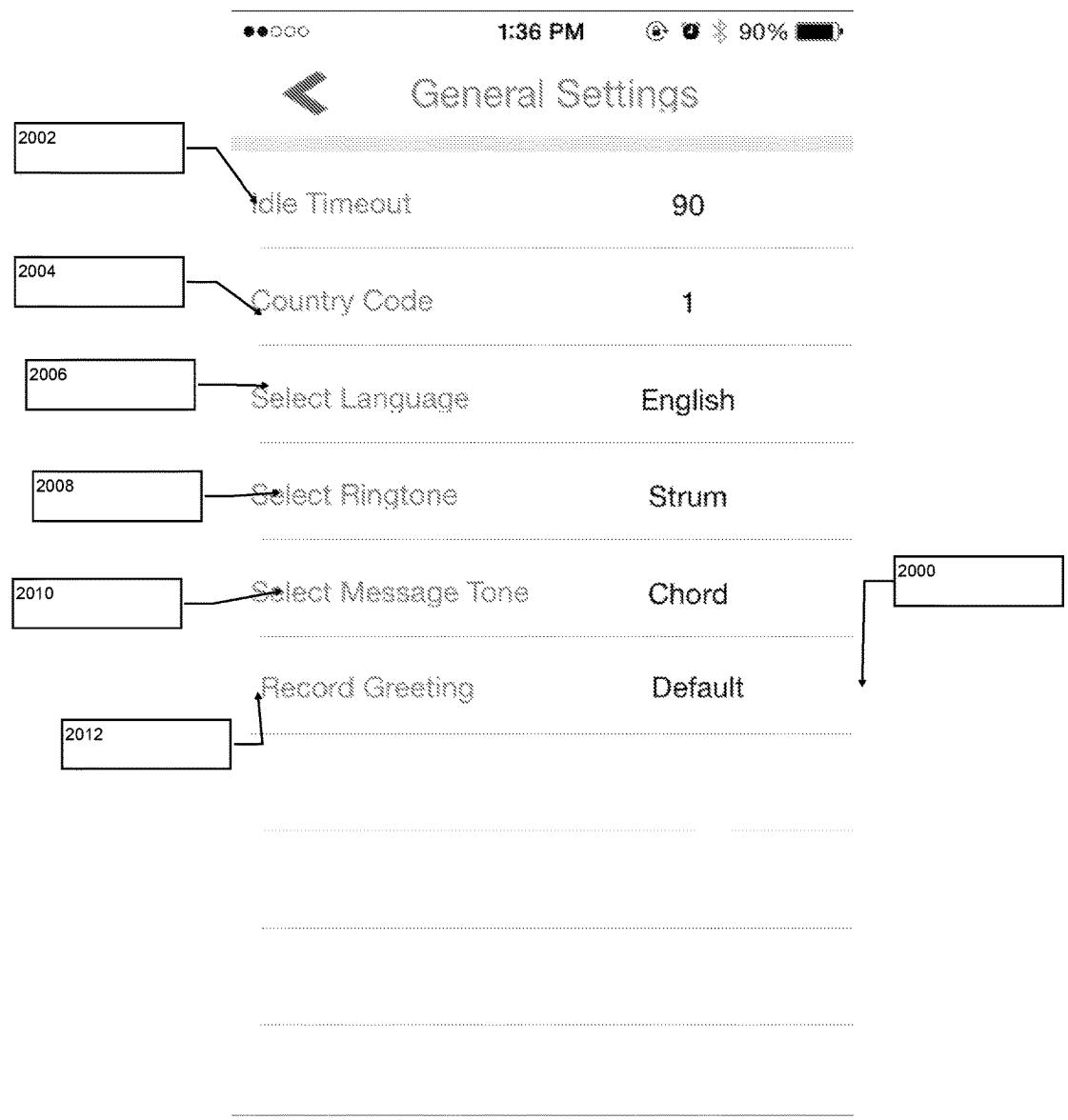
FIG. 20 depicts a configuration interface according to one embodiment of the disclosed invention.

FIG. 20 shows a configuration interface 2000 resulting from a user selecting the settings option 1516 in FIG. 15. Selecting the settings option allows a user to change settings such as an idle timeout setting 2002, a country code setting 2004, a language configuration setting 2006, a ringtone setting 2008 and a message tone setting 2010. Notably, a record greeting option 2012 can be advantageous to a user to leave a message to another user dropped from an ongoing conference call.

Figure 21:
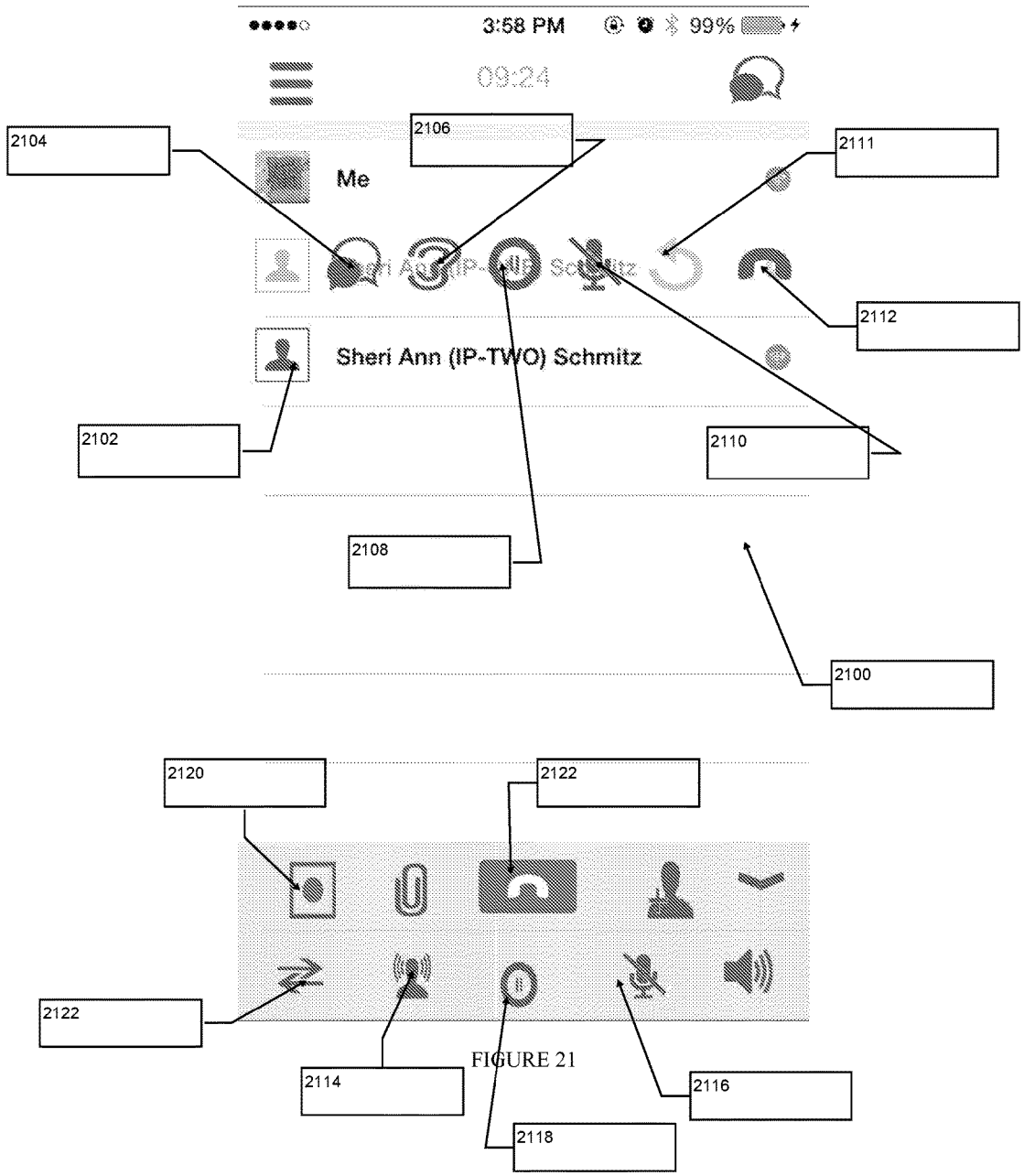
FIG. 21 illustrates dashboard interface according to one embodiment of the disclosed invention.

Selecting a contact may enable a user to initiate a conference call as via an interface 2100 shown in FIG. 21, which illustrates the options available for a user when interacting with a contact. A user may select a contact 2102 and perform several operations while communicating with the selected contact. A chat icon 2104 represents the ability of a user to engage in a text message conversation with a participant. The user may select an ear icon 2106 to enable said user to have a private conversation with a participant i.e. to "whisper" with a participant in the midst of a conference call. The user may also select a pause icon 2108 to put a participant on hold. Additionally, the user may select a microphone icon 2110 to mute a participant on a conference call. The user may redial a participant by selecting a redial option 2111.

The 2114 option allows a user to mute all participants, thereby enabling a "broadcast" type of call wherein only the user is able to be heard. The microphone 2116 may allow a user to mute the microphone of the user. The pause icon 2118 allows a user to put all participants in an ongoing conference call on hold. By selecting a record option 2120, a user may record an ongoing conference call on. The icon 2122 represents an option which allows a user to swap control of a conference between an organizer and a participant. This control swap feature is further described in conjunction with FIG. 32. Finally, the user may conclude the ongoing conference call be selecting end conference call option 2122.

Figure 22:
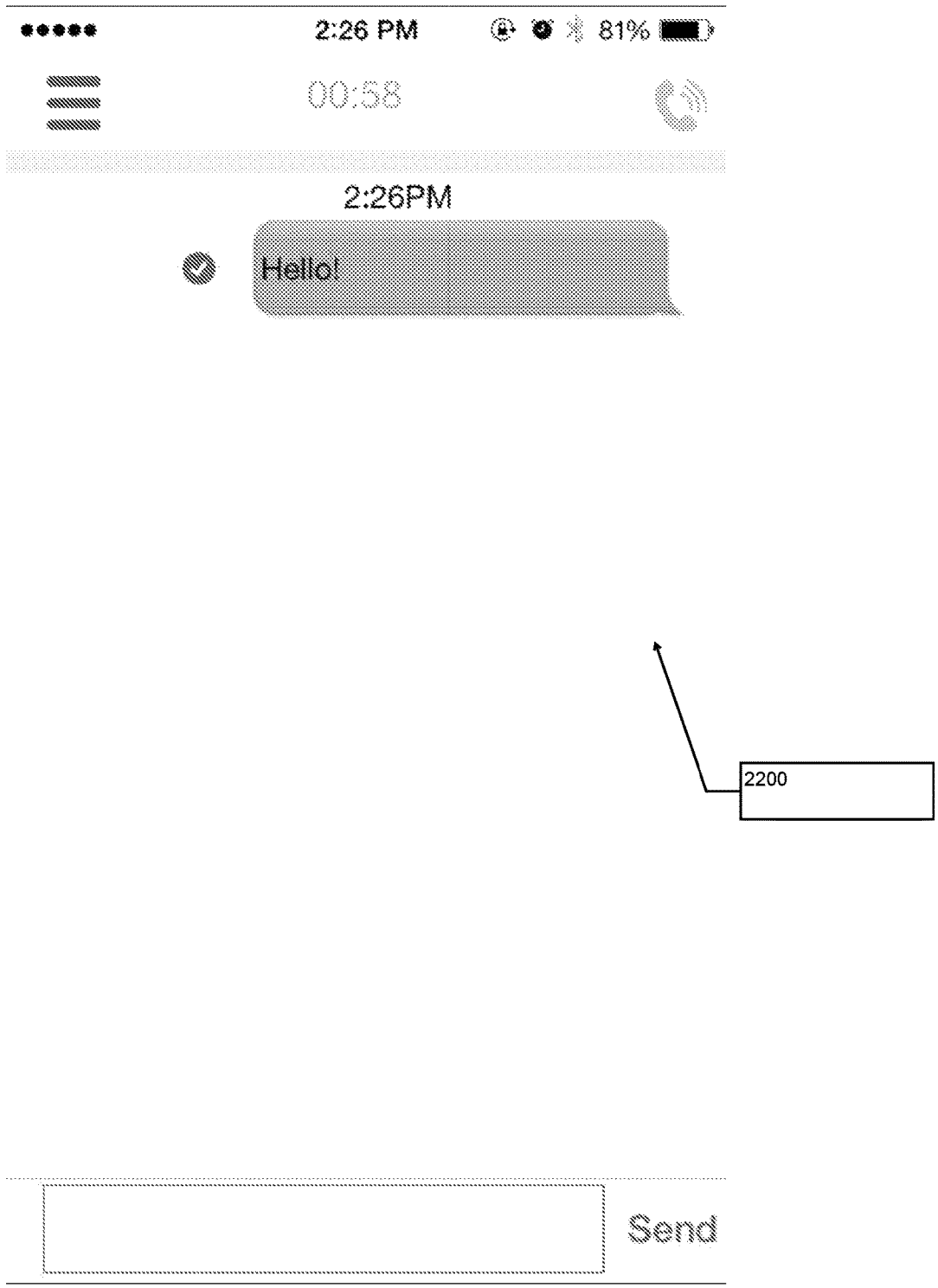
FIG. 22-23 depict group chat interface according to one embodiment of the disclosed invention.
Figure 23:
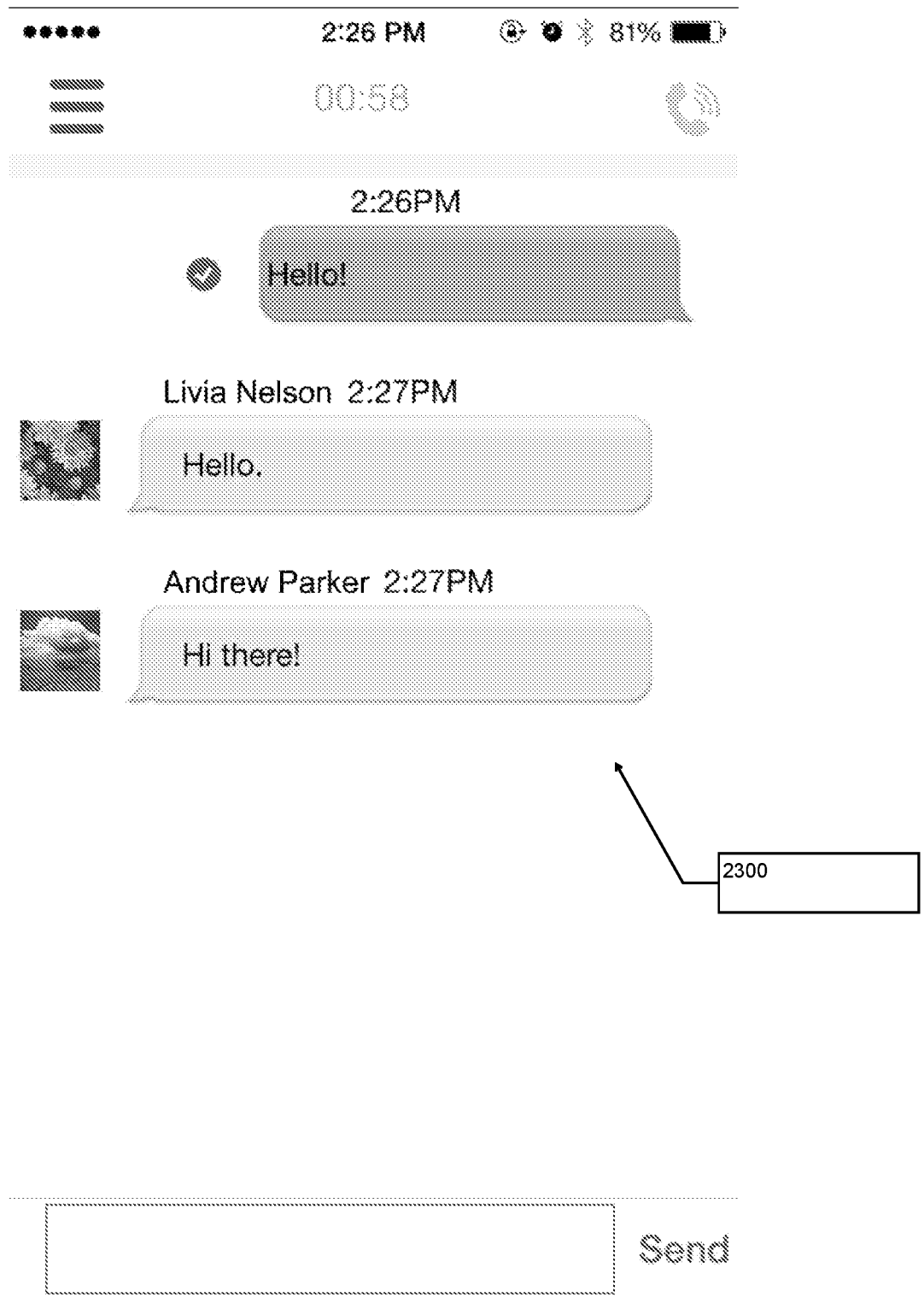
Figure 24:
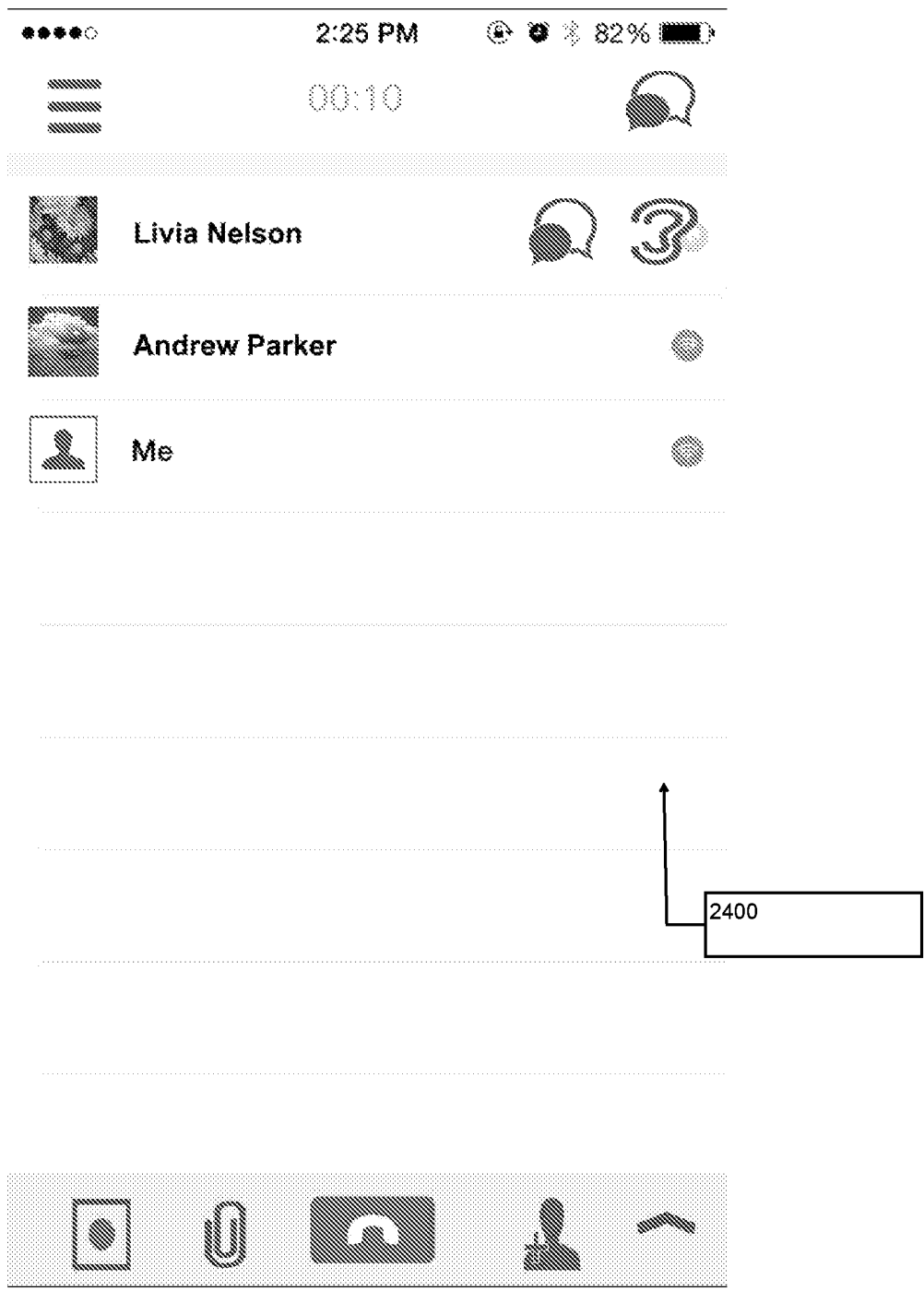
FIG. 24 illustrates interface which represents a whisper option available to a user connected to a participant in the midst of a conference call.
Figure 25:
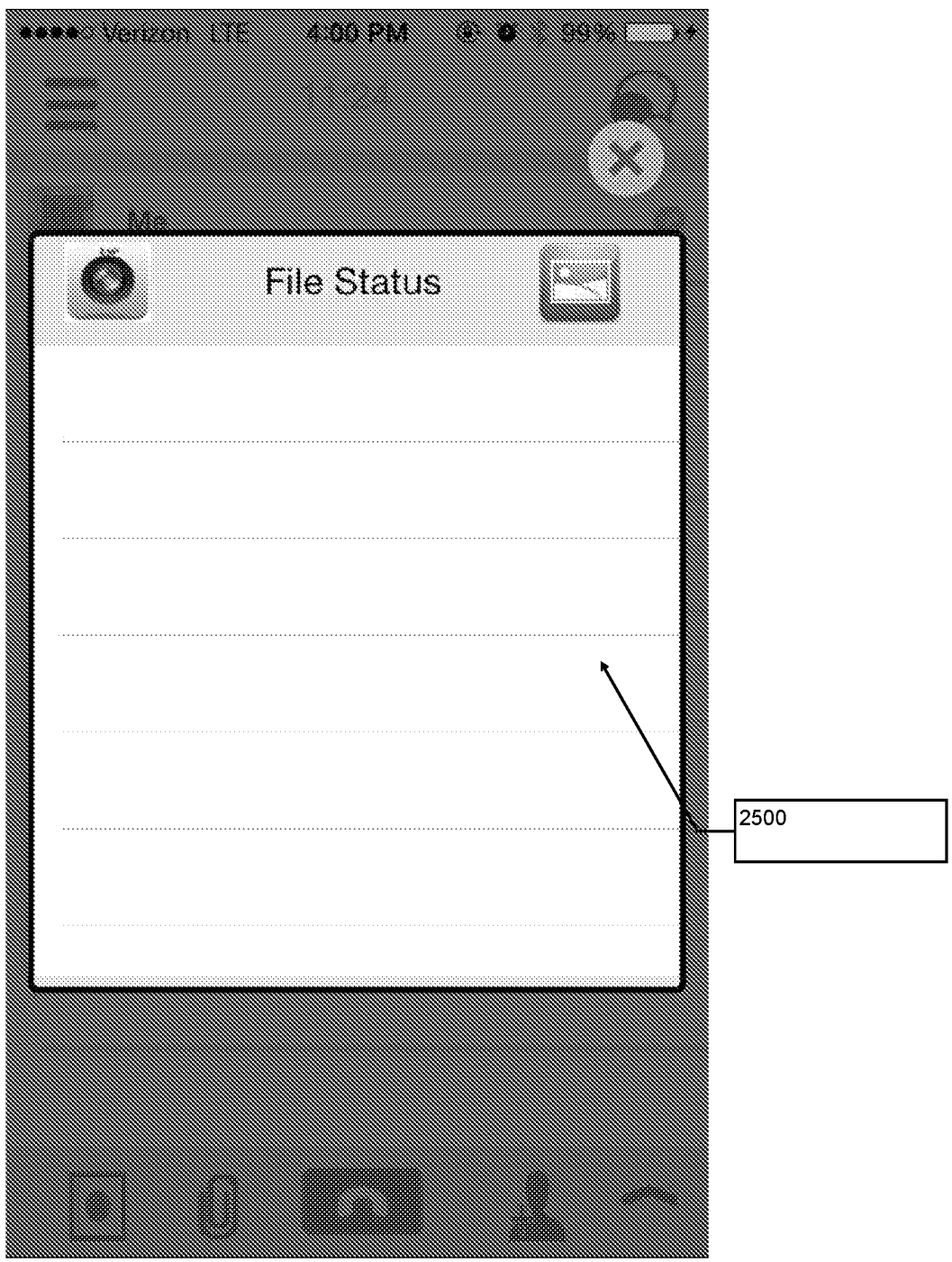
FIGS. 25-28 illustrates interface displaying files sharing capabilities according to the one embodiment of the disclosed invention.

The user may initiate an instant messaging session or a group chat while an ongoing conference call is still in session as illustrated via interfaces 2200 and 2300 shown in FIGS. 22 and 23 respectively. Referring now to FIG. 24 which illustrates interface 2400 representing a display available to a user connected to a participant in the midst of a conference call. FIG. 25 illustrates interface 2500 displaying status of files shared between a user and a participant.

Figure 26:
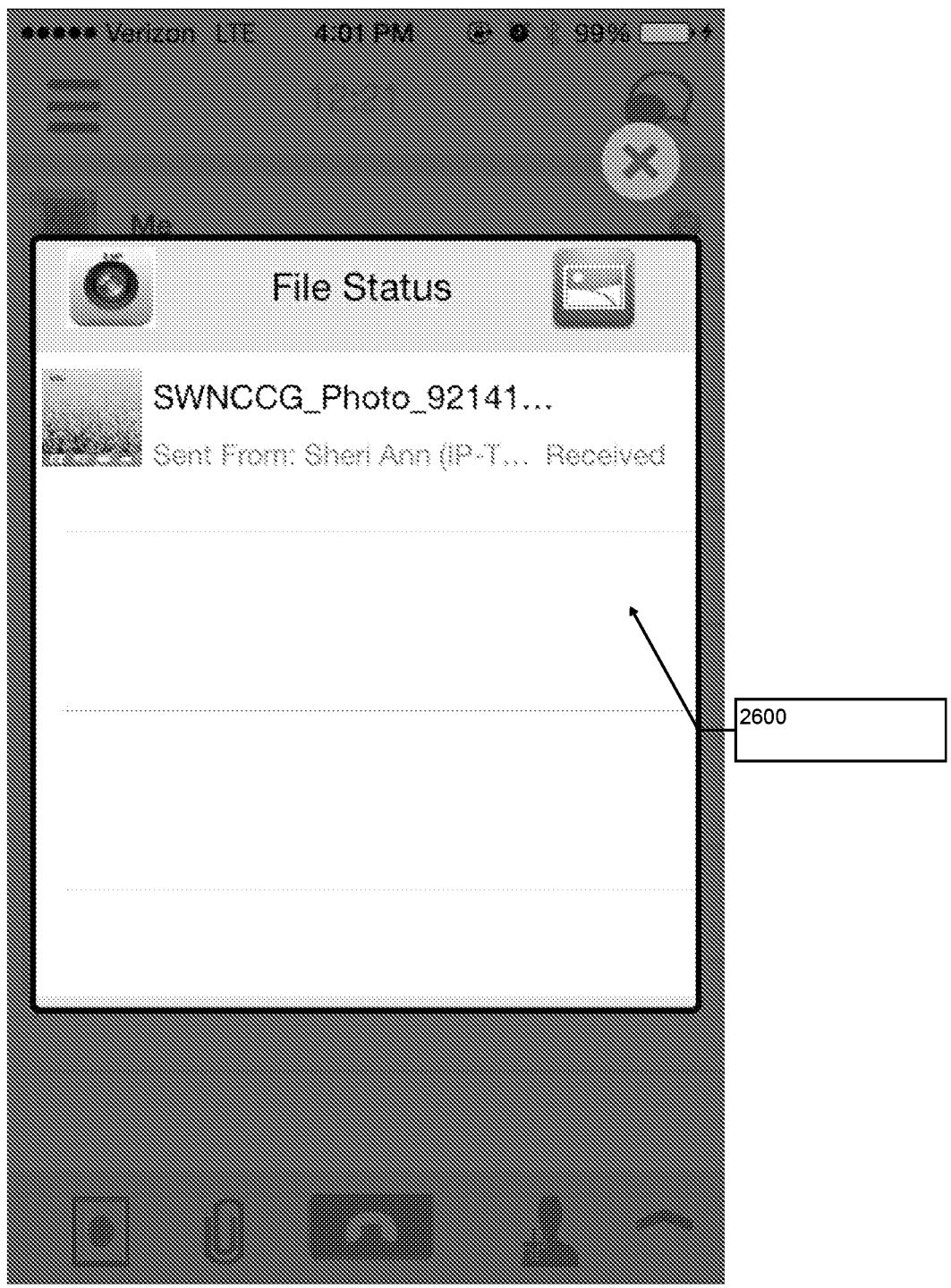
Figure 27:
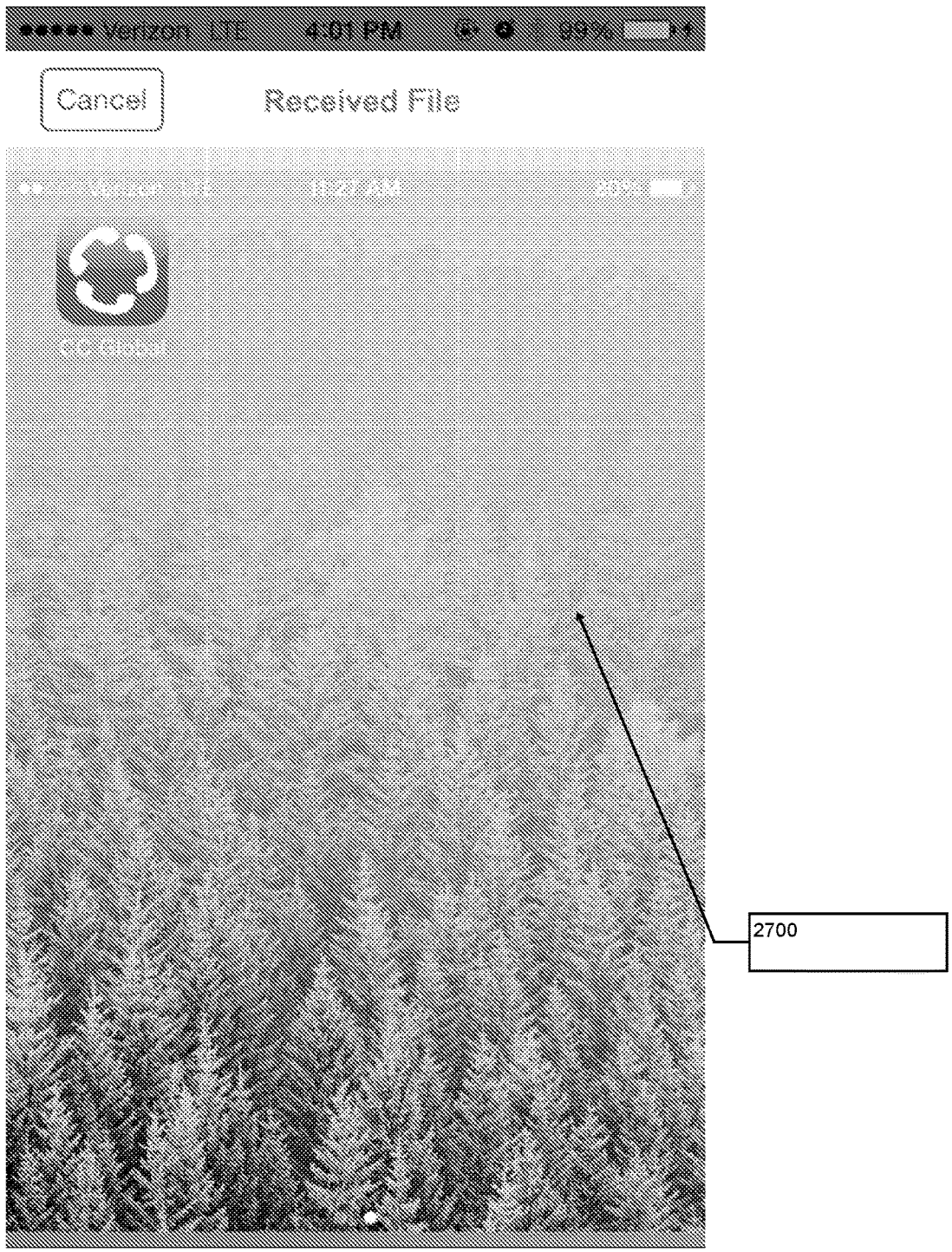
Figure 28:
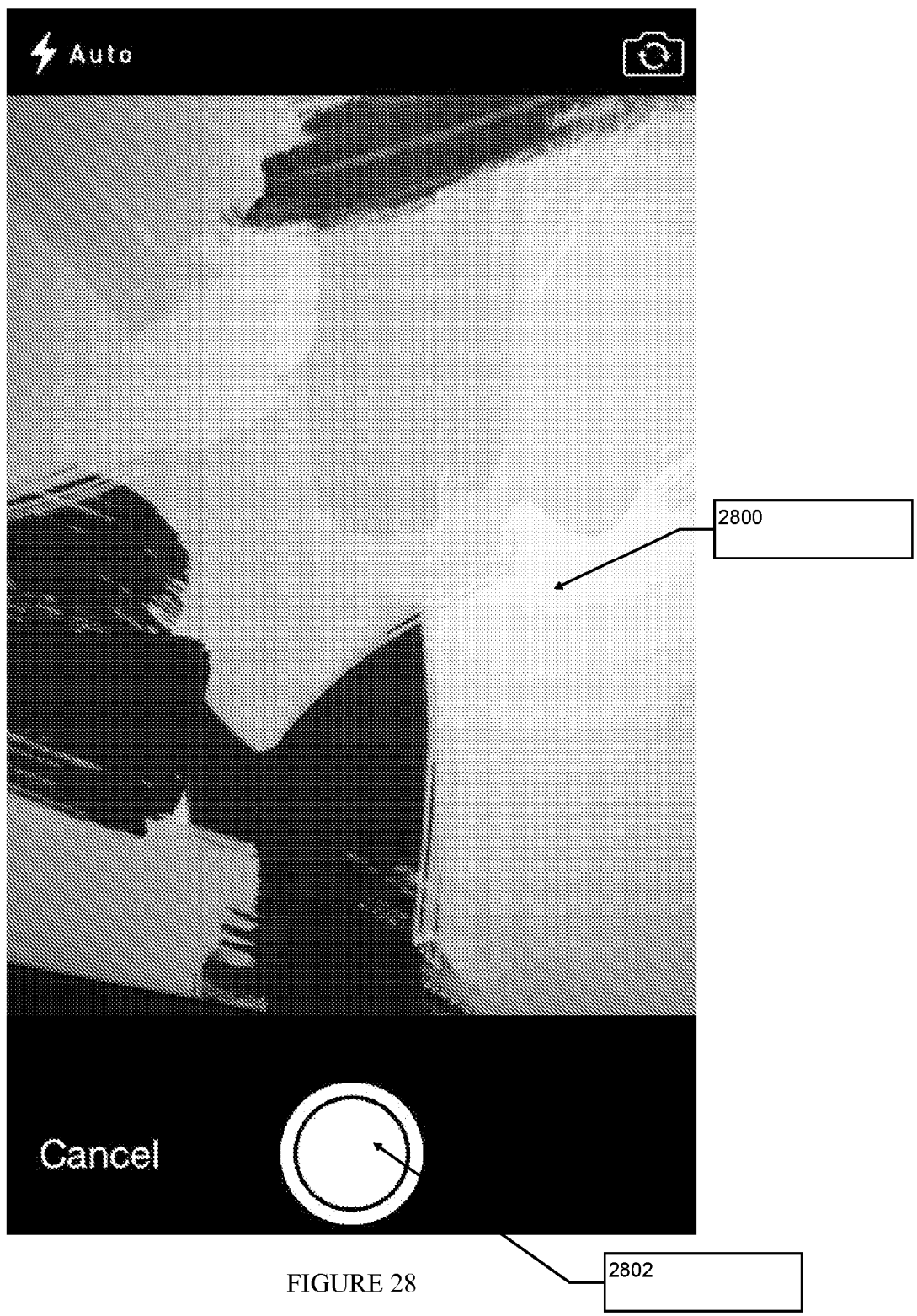

Similarly, interface 2600 shown in FIG. 26 also displays status of shared files. An interface 2700 shown in FIG. 27 may allow the recipient to view the received or shared media file. FIG. 28 represents interface 2800 which indicates an option 2802 which may allow a user to capture a photograph of the user during an ongoing conference call and send the captured photograph to another user while the conference call is still in session.

Figure 29:
FIG. 29 indicates a join live conference call interface of the disclosed invention.

The claimed system and method allows an organizer of a conference call to add a participant to an ongoing conference call. If a conference call participant accidently drops out of the conference call, then the organizer or the dropped participant may take measures to reestablish the communication link to reconnect with the dropped participant. For example, the dropped out participant can select a join call option 2902 as displayed on an interface 2900 in FIG. 29 in order to rejoin the conference call from which the participant was previously dropped.

Figure 30:
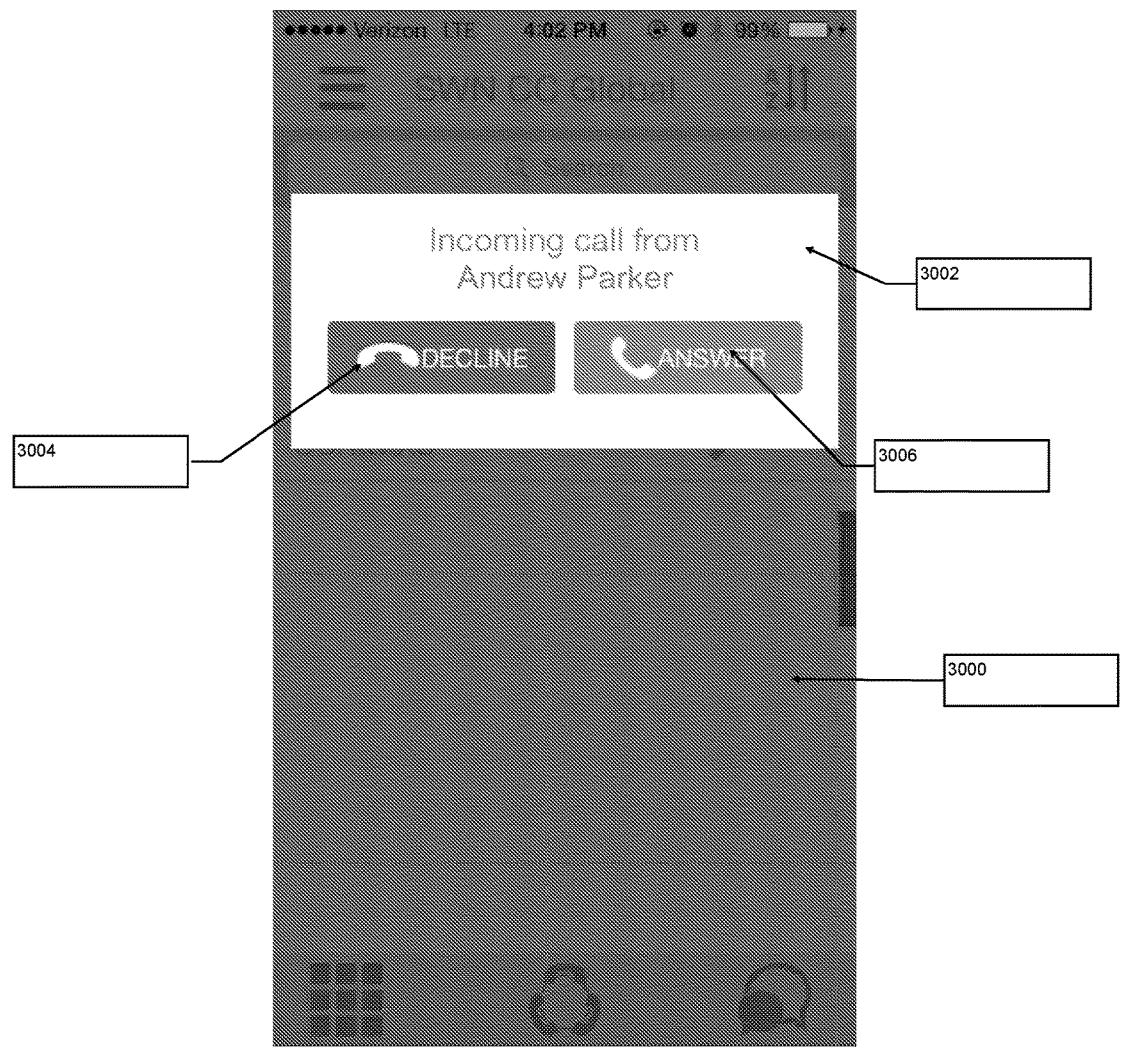
FIG. 30 illustrates interface displaying incoming call indication notification.

Likewise, the claimed system and method allows the organizer to reconnect with the dropped participant, without having the organizer to identify contact number of a dropped participant and having to dial the identified contact number of the participant that has been dropped from a call. When the organizer invites the dropped participant to reconnect the conference call, then the participant who has previously been dropped from the conference call may receive a prompt to re-join said call without having to dial the conference call number or retrieve the conference call log-in information. FIG. 30 illustrates interface 3000 displaying incoming call indication notification 3002. In response to this notification, the previously dropped out participant may rejoin the call by selecting accept option 3006 or decline using option 3004. This technology allows an organizer to preserve a bridge connecting a participant to said organizer or to another participant.

Figure 31:
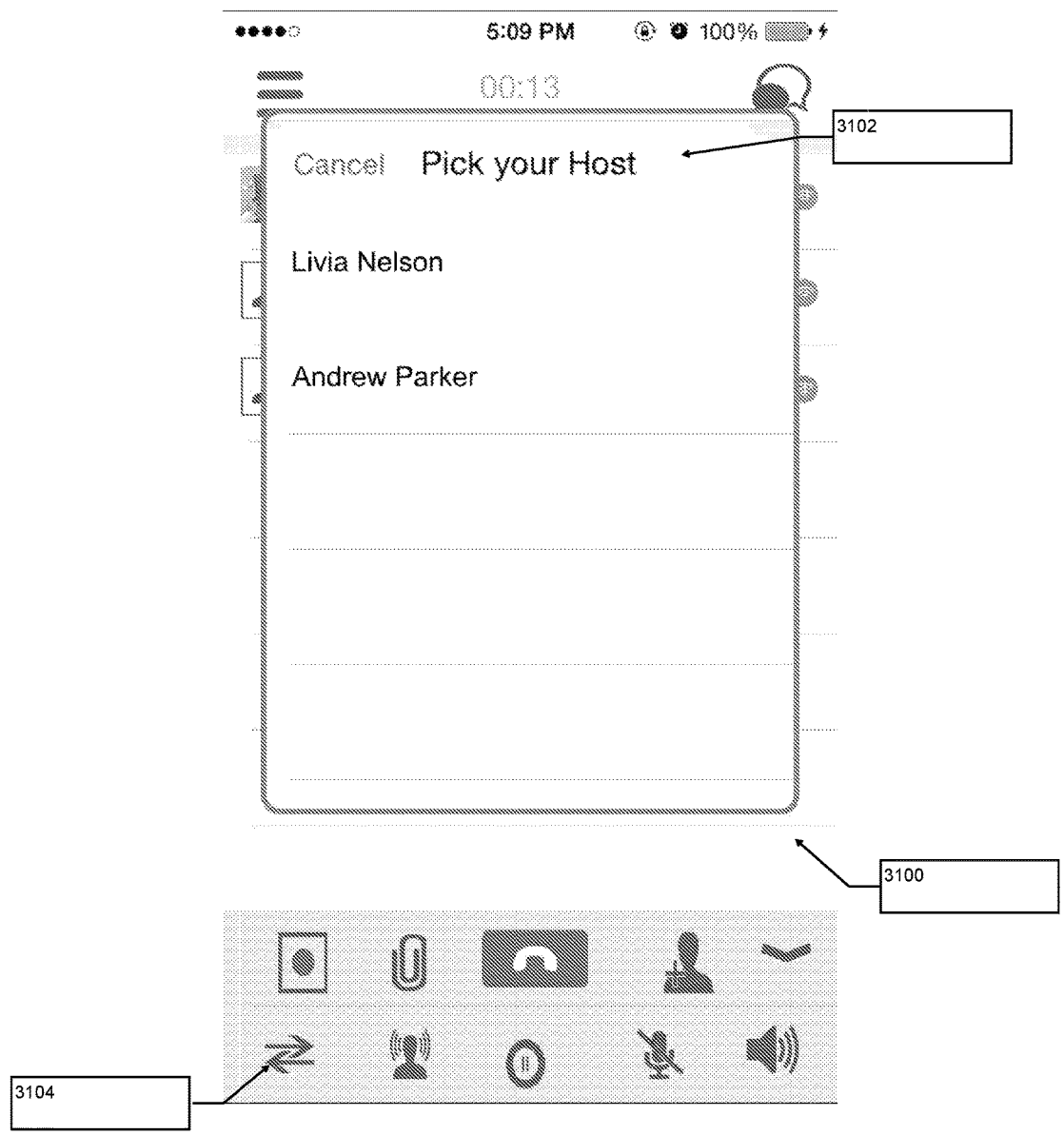
FIG. 31 demonstrates a host transfer capabilities of the disclosed invention.

The claimed system and method allows a user to transfer host capabilities to another participant. This phenomenon is illustrated in an interface 3100 shown in FIG. 31. In this context, a host is where the audio stream is mixed pre-transmission. This feature may be helpful when a current host becomes unavailable or is otherwise not a desired candidate to conduct host functions for example, current host has a poor or no communication link, has a less desired standpoint, has medical emergency, has other prior commitments, and the like. In this situation, the conference call organizer may be presented a list of available host candidates in the display area 3102. In response, the organizer may select a swap admin control option 3104 to select a substitute host providing a replacement for the current host. According to one embodiment of the disclosed invention, the claimed system and method may enable a call to proceed even if a back-end system fails. The disclosed system may on its own call a participant who may be dropped from a call. This innovative seamless management of a conference call is a fault tolerant feature of the claimed system and method.

Figure 32:
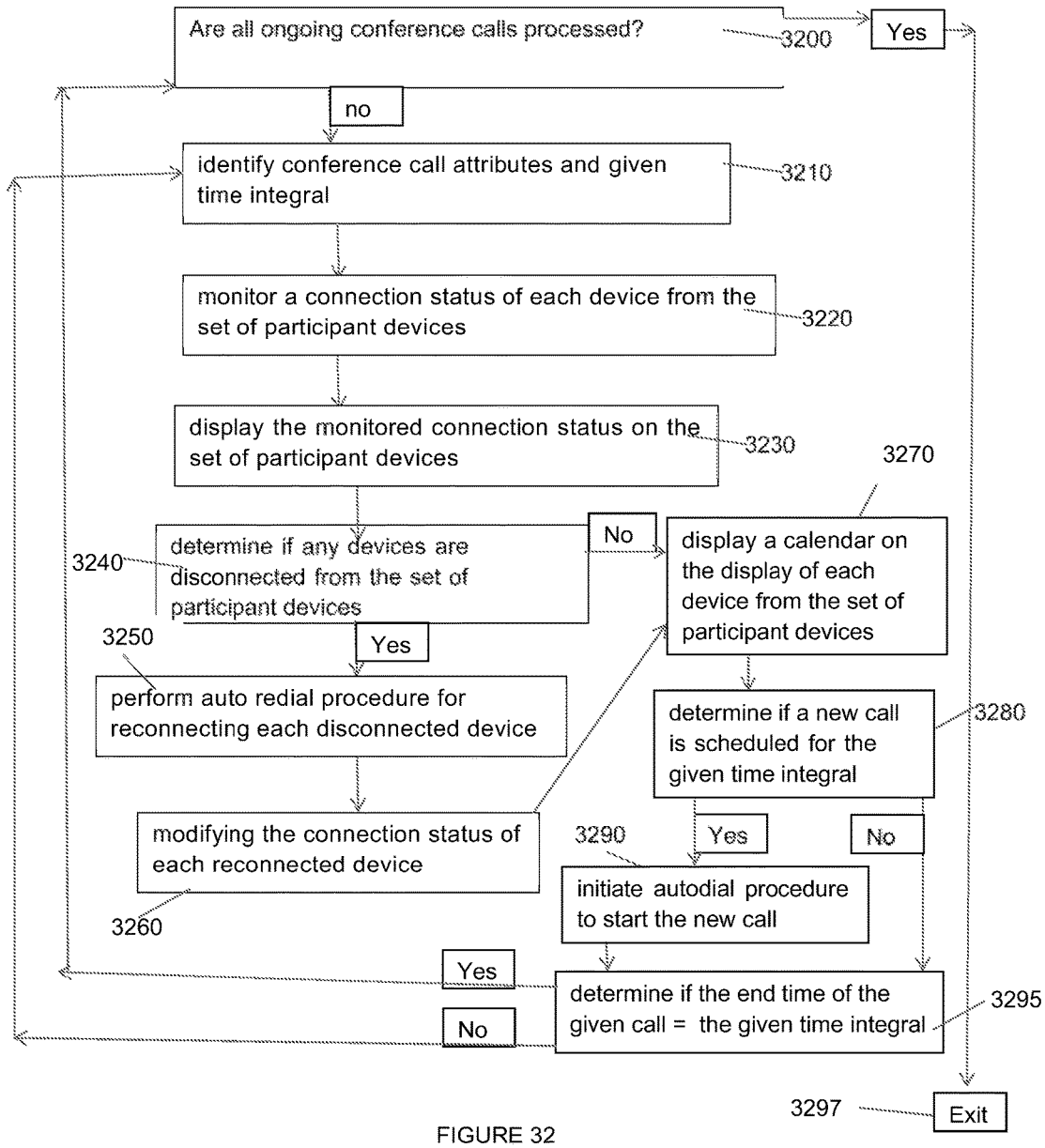
FIG. 32 represents a flow chart displaying various operations performed by one embodiment of the disclosed system to schedule, initiate and manage conference calls.

FIG. 32 represents a flow chart displaying various operations performed by one embodiment of the disclosed system to schedule, initiate and manage conference calls. The process may iteratively perform the following steps for a given conference call at a given time integral. At block 3200 the method may determine whether all ongoing conference call are processed. If all ongoing conference call are not processed, then the process may move to block 3210 to identify a set of attributes of the given conference call from a conference call database, the set of attributes comprising: an end time, a set of participants, and a set of participant devices of the given conference call.

The process may monitor a connection status of each device from the set of participant devices at block 3220 and display the monitored connection status on the set of participant devices at block 3230. The process may at block 3240 determine if any devices are disconnected from the set of participant devices, wherein the disconnected device is previously connected but currently disconnected from the given conference call. If any devices are disconnected from the set of participant devices, then at block 3250 the process may modify the connection status of each disconnected device from the set of disconnected devices after performing an auto redial procedure for reconnecting each disconnected device with the given conference call.

Alternatively, if no devices are disconnected from the set of participant devices, then the process may move to block 3270 to display, in real time, a calendar on the display of each device from the set of participant devices to schedule a conference call in the future. At block 3280 if the process determines that a new call is scheduled for the given time integral, then the process may move to block 3290 to initiate an auto dial procedure. However, if after reviewing the calendar the process determines that no new call is scheduled for the given time integral, then the process may move to block 3295 to terminate the given conference call if the end time of the given conference call is scheduled at the given time integral. The process may terminate the conference call if the end time of the given conference call is scheduled at the given time integral at block 3295 and the process may move back to block 3200 to determine if all ongoing conference calls are processed.

Alternatively, if the end time of the given conference call is not scheduled at the given time integral, then the process may move to block 3210 to identify next time integral. The iterations continue until all the ongoing conference calls are processed. According to one embodiment of the disclosed invention, the step of identifying the conference call attributes is done in the loop because a participant may switch the device via which the participant is connected with the conference call, for example, a user may use a landline to accept conference call invitation while in the house and may switch to a mobile device while leaving the house. A seamless transition between a set of previously identified participant devices is made possible because of the disclosed invention.

In other words, each participant may have a set of devices that the participant may choose from for accepting the conference call invitation. This may avail robust communication link between the participant and the conference call. As such, if the participant's mobile device is out of range, or if the wireless network is down and cellular network is out of range then the disclosed system may send an email invitation to the participant. The concept of conference call invitation is further described in conjunction with FIG. 33.

Figure 33:
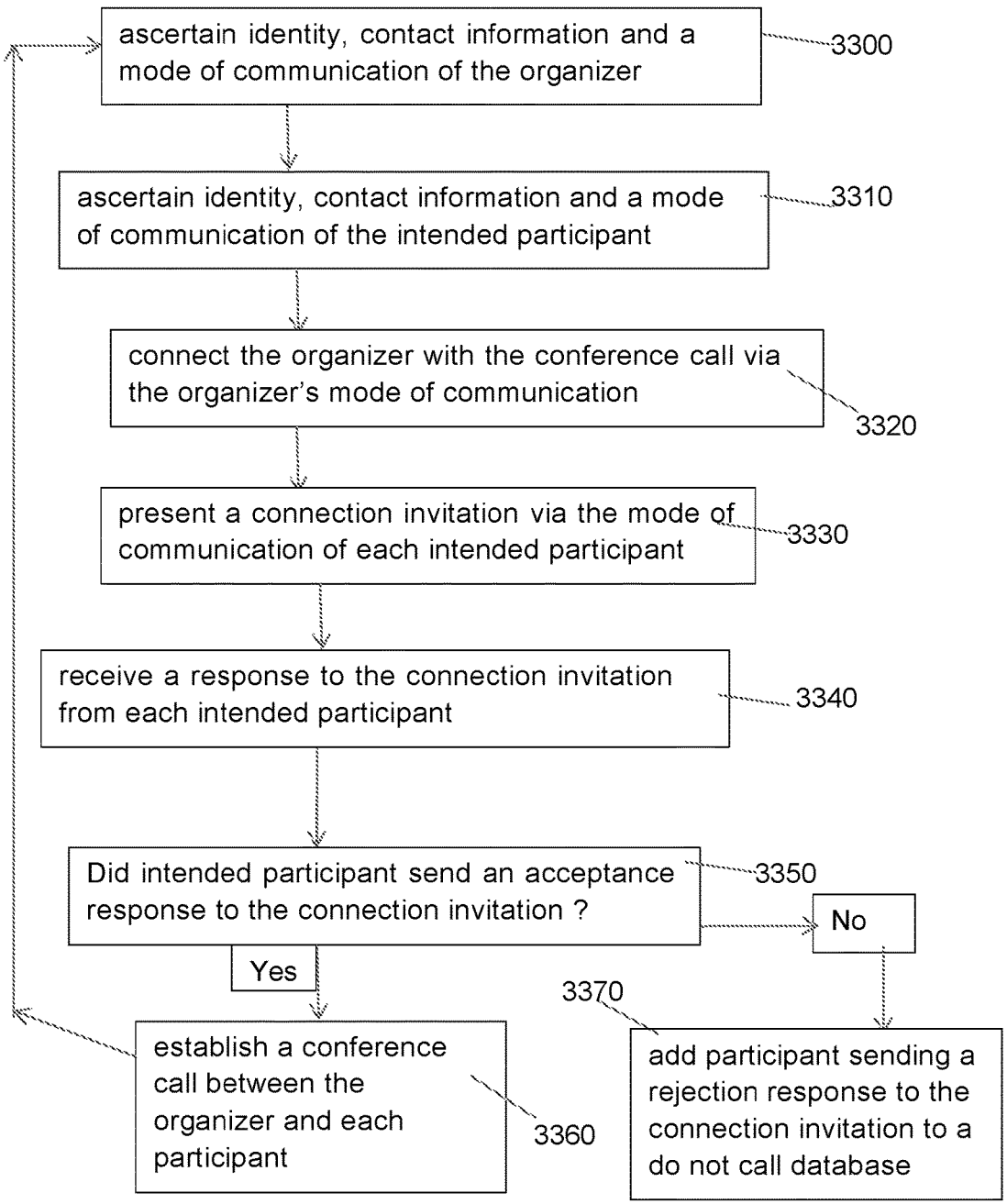
FIG. 33 illustrates a block diagram illustrating autodial procedure of one embodiment of the disclosed invention.

Now turning to FIG. 33 showing a block diagram illustrating autodial procedure shown at block 3290 in FIG. 32. At block 3300 the process may ascertain the identity, the contact information and a mode of communication of the organizer of the scheduled conference call via an organizer database. Likewise, at block 3310, the process may ascertain the identity, the contact information and a mode of communication of each intended participant of the scheduled conference call via a participant database. The process may present a connection invitation on the display of the mode of communication of each intended participant of the scheduled conference call at block 3330 after connecting the organizer with the conference call via the organizer's mode of communication at block 3320.

Resultantly, the process may receive a response to the connection invitation from each intended participant of the scheduled conference call at block 3340. Further at block 3350 the process may determine if the intended participant sent an acceptance response. The process may at block 3360 establish a conference call between the organizer and each participant sending an acceptance response to the connection invitation if the intended participant sent an acceptance response. Alternatively, if the intended participant sent a rejection response, then the process may add participant to a do not call database at block 3370. In one embodiment of the disclosed invention, the disclosed system may verify that the disconnected device has sent an acceptance response to the connection invitation for the scheduled conference call before performing the auto redial procedure for the disconnected device.

Figure 34:
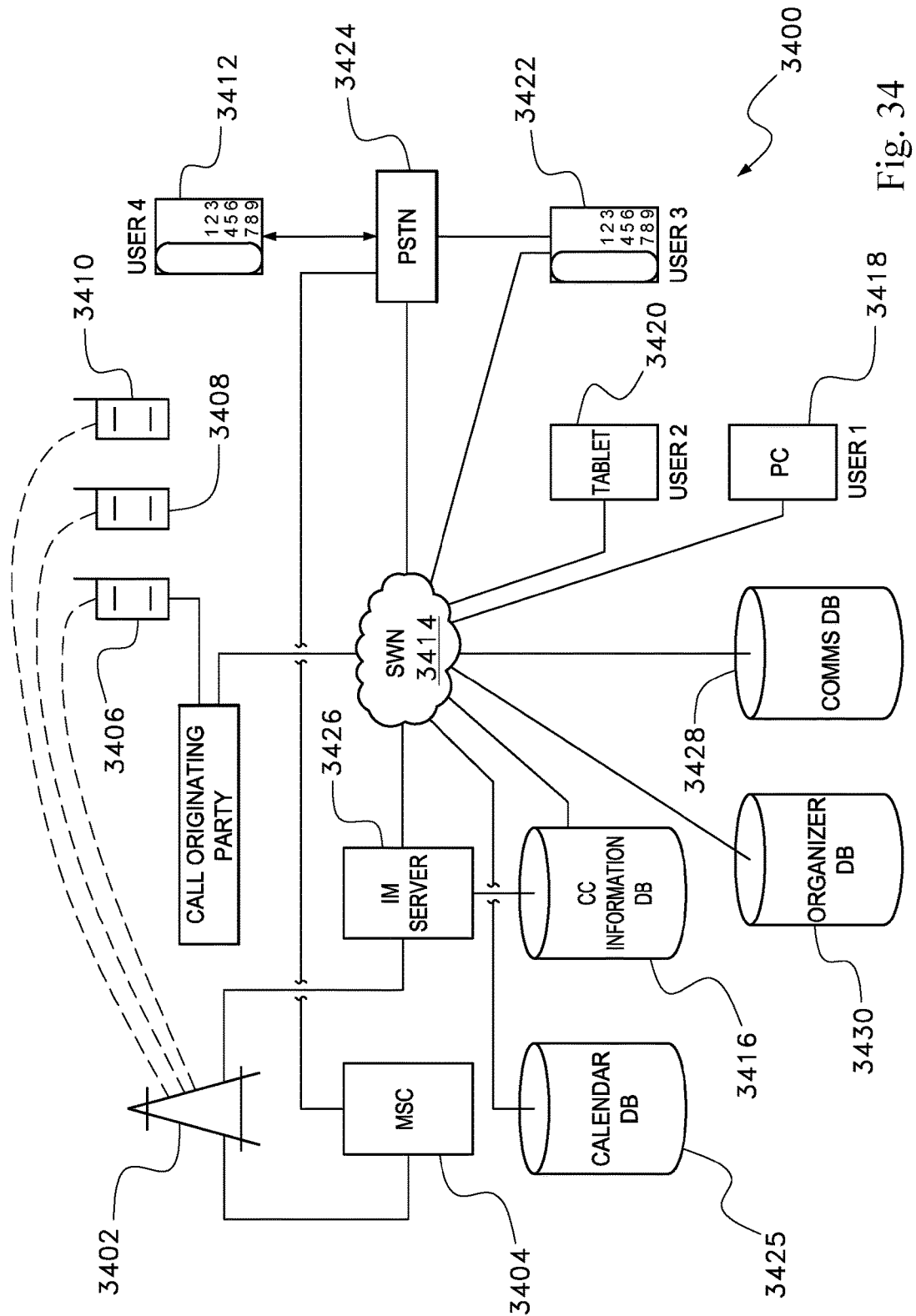
FIG. 34 illustrates a block diagram showing various components of the disclosed system according to an embodiment of the disclosed invention.

FIG. 34 illustrates an integrated communications network 3400. The network includes a base station 3402 coupled to a mobile switching center (MSC) 3404, mobile terminals 3406, 3408, and 3410. The network 3400 also includes a SWN cloud 3414, personal computer 3418, a computing device 3420, a landline telephone 3422, and PSTN 3424. In the example communications network 3414, some of the aforementioned communication devices may have the disclosed system application installed, which may enable the devices to exchange voice and data with other computing devices in real-time.

FIG. 34 illustrates several databases such as a conference call information database 3416, a contact database 3428, and a calendar database 3426 in communication link with the communications network 3414, many other databases may be included in the disclosed system to facilitate conference call switching as disclosed herein. The disclosed method may maintain a conference call information database 3416 comprising a set of records, each record comprising: a conference call identifier, a date, a start time, an end time, a list of intended participant identifiers, a list of actual participants, a set of media files exchanged, a status. Further, the disclosed method may also maintain a participant or contact database 3428 comprising a set of records, each record comprising: a participant identifier, a list of devices associated with each participant, a preferred mode of communication, participation history and the like. An organizer database 3430 comprising a set of records, each record comprising: a participant identifier, at least one conference call identifier may also be maintained by the disclosed method.

Notably landline telephone 3412 and 3422 may not have the disclosed application installed. Nevertheless, the call originating party 3406 may via dial in option 1504 shown in FIG. 15 call the landline telephones 3412 and 3422. The disclosed system may use instant messaging server 3426 to offer services, such as, short message service (SMS) messages to send messages via the instant messaging while an ongoing conference call is in progress. Conference calls may be conducted and managed in parallel to the instant messaging sessions among the conference call participants. The Network 3414 may be configured to execute server side instructions for the disclosed method.

On the other hand computing devices such as the personal computer 3418, the tablet 3420, and the cellular telephones 3408 and 3410 may be configured to execute client side instructions for the disclosed method. The client side computing devices may comprise non-transitory computer readable medium containing computer instructions configured to operate with electronic computer hardware to manage operations during a conference call held on a first communication device, the operations comprising enabling a user or a call originating party via cellular phone 3406 to start a chat session and engage in said chat session during the conference call. The instant messaging data and participant status information may be stored in the instant messaging server 3426. The disclosed method may store information pertaining to each conference call along with each conference call participant in the conference call information database 3416.

These two databases may work in conjunction to indicate status of each participant in the instant messaging session in real time. Likewise, the disclose method may also enable a user to view status of participants of a conference call in real time. This feature may be beneficial for example, when the conference call subject matter warrants a private discussion among a selected few members of the conference call. In other words, the disclosed method may enable a user to view status of a participant of a chat session during a conference call in real time, and also enable a user to view real time data pertaining to a participant of a conference call.

Notably, there may be a need to conduct and monitor multiple conference calls, for example, in a product development area, different teams may be assigned different modules of the product and team manager may have to take questions from team A which is responsible for product testing to team B which may be responsible for software development. In this situation the disclosed method may enable a user, in this case a team leader to view real time status of multiple conference calls, and also enable a participant to join a call. In this example, there may be a need to view a time map of deliverables and view a conference call schedule of other teams. Thus, the disclosed method may enable a user to view a calendar to identify the date and time of a call, enable a user to view details, including date, time, duration, and participants, of a conference call in real time.

Further, the disclosed method may enable a user to schedule a call, enabling a user to connect a user to a call during a call in progress, and enable a user to dial a participant using a touch screen number pad. The disclosed method may also enable a participant to share media files with another participant in real time, and take a photograph as well as share said photograph with at least one other participant. The disclosed method may also enable a user to call, during call, a participant who loses connection to a call. The disclosed system may provide a media sharing interface to the conference call participants to share media files with another participant of the conference call in real time. In one embodiment of the disclosed invention, the media sharing interface is a touch screen number pad.

Figure 35:
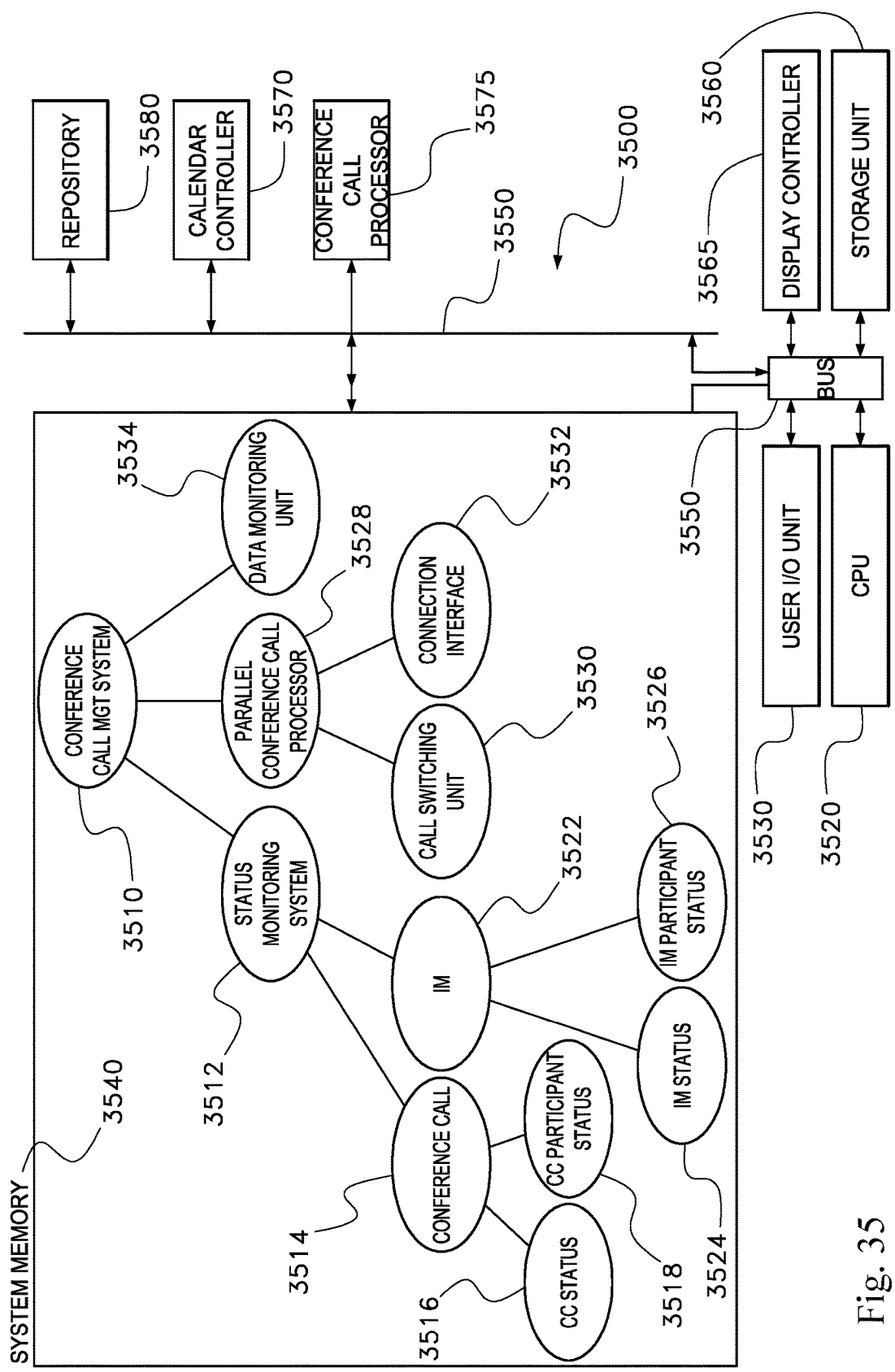
FIG. 35 depicts a block diagram showing one embodiment of a computer system.

Now turning to FIG. 35 a block diagram showing an embodiment of a computer system 3500 that can implement any of the embodiments of the conference call management system 3510 that are described herein. The computer system 3500 includes a processing unit 3520 (CPU), a system memory 3540, and a system bus 3550 that couples the processing unit 3520 to the various components of the computer system 3500. The processing unit 3520 may typically include one or more processors, each of which may be in the form of any one of various commercially available processors. A user input output unit 3530 may work in conjunction with the conference call management system 3510, a conference call processor 3575 and a display controller 3565 to accept input from and to display output to a user.

The system memory 3540 typically includes a read only memory (ROM) that stores a basic input/output system (BIOS) that contains start-up routines for the computer system 3500 and a random access memory (RAM). The system bus 3550 may be a memory bus, a peripheral bus or a local bus, and may be compatible with any of a variety of bus protocols. The computer system 3500 also includes a storage memory 3560 (e.g., a hard drive, a floppy drive, a CD ROM drive, magnetic tape drives, flash memory devices, and digital video disks) that is connected to the system bus 3550 and contains one or more computer-readable media disks that provide non-volatile or persistent storage for data, data structures and computer-executable instructions.

The disclosed system for non-transitory computer readable medium containing computer instructions configured to operate with electronic computer hardware to manage operations during a first conference call between a first communication device and a plurality of communication devices is shown in FIG. 35. The system comprising a calendar controller 3570 in communication with a repository 3580 causing a display of conference call information on a display of each of the plurality of communication devices involved in a given conference call. The repository 3580 may include several databases such as databases shown in FIG. 34 including but not limited to a calendar database 3426, a contact database 3428, a conference call information database 3416 and the like. Other databases well known in the telecommunication industry may also be included in the repository 3580.

A calendar display may be caused by a calendar controller 3570. The calendar display may be helpful to identify a set of attributes of at least one conference call in real time. The set of attributes may provide additional information pertaining to a given conference call, the additional information may for example include but is not limited to the conference call date, the conference call time, the conference call duration, a list of conference call participants, and the like. This feature may be useful in scheduling new conference calls or rescheduling previously scheduled conference calls.

The conference call management system 3510 may comprise a status monitoring system 3512 which may include a conference call unit 3514 and an instant messaging unit 3522. The conference call unit 3514 may further include a conference call status unit 3516 which may indicate status of each ongoing conference call. Similarly, the conference call unit 3514 may comprise a conference call participant status unit 3518 may indicate status of each participant of each ongoing conference call.

The conference call participant status unit 3518 of the disclosed system may display for each participant connected to the conference call, a connected status on a display of each of the plurality of communication devices. Likewise, the conference call participant status unit 3518 of the disclosed system may display for each participant disconnected from the conference call, a not-connected status on a display of each of the plurality of communication devices. Further, a connected participant of an ongoing conference call may initiate an outgoing call to establish a communication link with a disconnected participant. In one embodiment of the disclosed invention, the connection interface 3532 may comprise a re-connection interface for a conference call participant to establish a communication link with a participant who had previously established and subsequently lost a connection to the conference call, and wherein the re-connection interface is a touch screen number pad.

In other words, the disclosed system may comprise a participant status display interface 3518 to indicate a participant status of each participant of the conference call on a display of each of the plurality of communication devices in real time. Thus, the conference call status unit 3516 may indicate status of each ongoing conference call, while a conference call participant status unit 3518 may indicate status of each participant of each ongoing conference call.

The instant messaging unit 3522 may include an instant messaging status unit 3524 which may indicate status of each ongoing instant messaging session. Similarly, an instant messaging participant status unit 3526 may indicate status of each participant of each ongoing instant messaging session. The conference call management system 3510 may comprise a parallel conference call processor 3528 to schedule and initiate a second conference call during the ongoing first conference call. The parallel conference call processor 3528 may work in conjunction with the conference call processor 3575 to connect a participant in the first conference call to the second conference call while the first conference call is in progress.

In other words, the conference call status unit 3516 may retrieve status information of ongoing conference calls via calendar controller 3570 and repository 3580. A connection interface 3532 of the parallel conference call processor 3528 may present a list of ongoing conference calls on the on a display of each of the plurality of communication devices in real time. A user, who is a participant of a first conference call, may select a second ongoing conference call via the connection interface 3532. A call switching unit 3530 of the parallel conference call processor 3528 may place the first conference call on hold and designate the user as a participant of the selected second conference call. Resultantly, the parallel conference call processor 3528 may notify the conference call participant status unit 3518 of the disclosed system to indicate the status of the switching participant from connected to not connected or on hold for the first conference call and as connected for the second conference call. Accordingly, the disclosed system may display the conference call status of each ongoing conference call on the display of each of the plurality of communication devices, receive a selection of a specific conference call from a participant, and join the participant in the selected conference call.

In one embodiment of the disclosed invention, a user may initiate a third conference call during while the first conference call and the second conference call are still in session, and connect each participant in the first conference call and the second conference call to the third conference call while the first conference call and the second conference call are in progress. Alternatively, a user may initiate a third conference call during the ongoing first conference call and the second conference call, and connect a selected group of participants in the first conference call and the second conference call to the third conference call while the first conference call and the second conference call are in progress.

The instant messaging unit 3522 may include an instant messaging status unit 3524 which may indicate status of each ongoing instant messaging session. Similarly, an instant messaging participant status unit 3526 may indicate status of each participant of each ongoing instant messaging session. Thus, a user may initiate in real time, a chat session between at least two communication devices of the plurality of communication devices during the ongoing first conference call, and display a chat participant status on the at least two communication devices in real time. This feature may be helpful for example for two group leaders to have a private communication about a decision being made in a conference call in which the rest of the team members are connected.

The conference call management system 3510 may include a data monitoring unit 3534 to display real time data pertaining to each participant of each conference call on the display of each of the plurality of communication devices. For example, in the aforementioned case, the two group leaders may exchange performance record of an employee before assigning a critical project to the employee. This feature may be helpful in business and marketing world where media files pertaining to advertisements such as jingles, audio files, video clips and the like may be circulated at once in a conference call.

Figure 36:
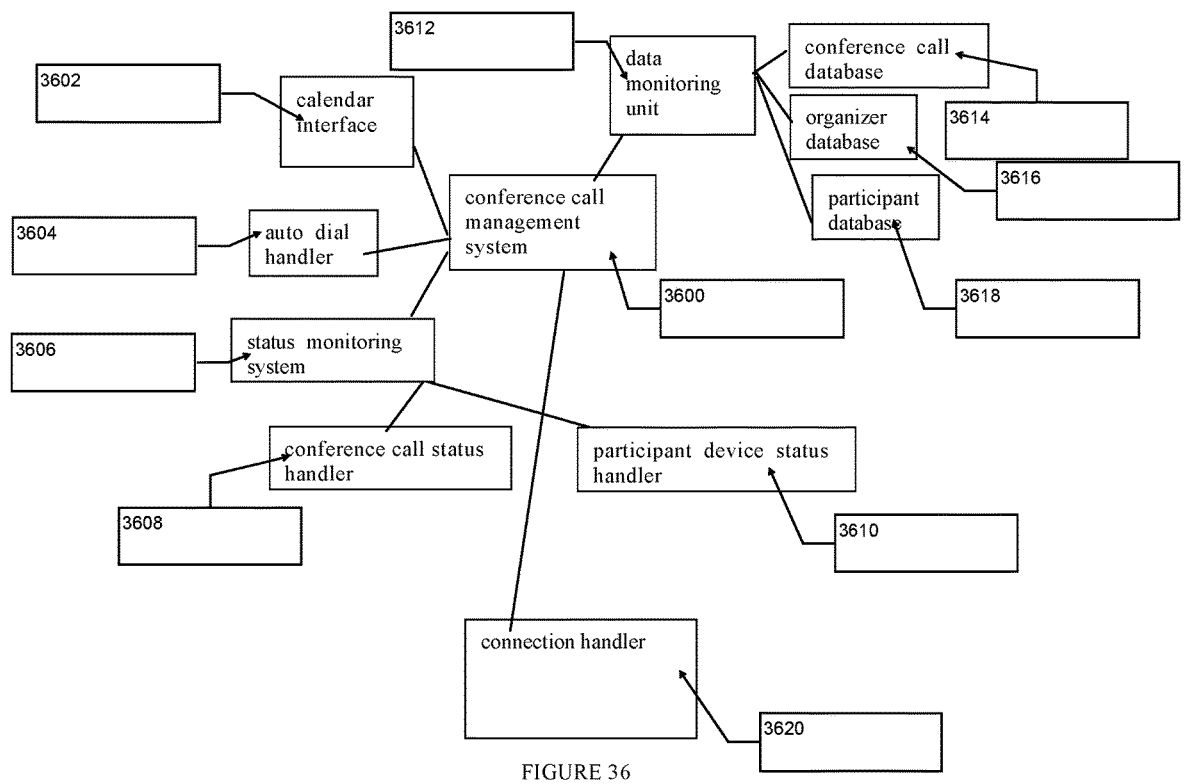
FIG. 36 shows several components of the disclosed system.

Now turning to FIG. 36 showing several components of the disclosed system. In particular, FIG. 36 shows a system for non-transitory computer readable medium containing computer instructions configured to operate with electronic computer hardware to manage operations during simultaneous conference calls, the system comprising a conference call management system 3600 processing each ongoing conference call by iteratively processing a given conference call at a given time integral, the conference call management system configured to: (1) identify a set of attributes of the given conference call from a conference call database 3614, the set of attributes comprising: an end time, a set of participants, and a set of participant devices of the given conference call; (2) display, in real time, a calendar interface 3602 on the display of each device from the set of participant devices; (3) initiate an auto dial procedure for a subsequent conference call after reviewing the calendar to determine if a subsequent call is scheduled for the given time integral; and (4) terminate the given conference call if the end time of the given conference call is scheduled at the given time integral.

The system further comprising: (1) a participant device status monitoring system communicatively coupled to the conference call management system 3600 to monitor a connection status of each device from the set of participant devices; (2) a display controller to display the monitored connection status on the set of participants devices; (3) a conference call participant status handler 3610 to identify a set of disconnected devices from the set of participant devices, wherein the disconnected device is previously connected but currently disconnected from the given conference call; and (4) connection handler to modify the connection status of each disconnected device from the set of disconnected devices after performing an auto redial procedure for reconnecting each disconnected device with the given conference call.

The connection handler 3620 is configured to: (1) ascertain an identity, a contact information and a preferred mode of communication of an organizer of the given conference call via an organizer database 3616; (2) ascertain an identity, a contact information and a preferred mode of communication of the each invitee of the conference call via a participant database 3618; (3) present a conference call invitation (invitation) to each invitee of the conference call after connecting the organizer with the conference call; (4) receive a response to the invitation from each invitee of the conference call; (5) add each invitee sending an acceptance response to the invitation to generate a list of participants; and (6) establish a conference call connection between the organizer and each participant in the list of participants.

The conference call participant status handler 3610 is further configured to: (1) verify that the disconnected device sent an acceptance response to the invitation; (2) ascertain an identity, a contact information and a preferred mode of communication of the disconnected device via the participant database; (3) present a second conference call connection invitation (second invitation) to the disconnected device; (4) receive a second response to the second invitation from disconnected device; and (5) establish a conference call connection between the participants of the given conference call and the disconnected device if the second response is an acceptance response.

The data monitoring 3612 unit of the disclosed system is configured to: (1) maintain a set of records in the conference call database, each record comprising: a conference call identifier, a date, a start time, an end time, a list of intended participant identifiers, a list of actual participants, a set of media files exchanged, and a status; (2) maintain a set of records in the participant database, each record comprising: a participant identifier, a list of devices associated with each participant, a preferred mode of communication, and a participation history; and (3) maintain a set of records in the organizer database, each record comprising: an organizer identifier, a list of devices associated with each organizer, a preferred mode of communication, and a participation history indicating at least one conference call identifier. The display controller of the disclosed system is further configured to display the calendar to schedule a subsequent conference call.

In an event if the subsequent conference call is a future conference call and wherein the display controller is further configured to: (1) select a future date, a start time, and a set of invitees for the subsequent conference call; and (2) cause the conference call management system to perform on the future date, the auto dial procedure via an auto dial handler 3604 for each participant from the list of participants to connect each participant to the subsequent conference call.

The disclosed system is further configured to add each participant sending a rejection response to the invitation to a do not call database. The system is further configured to perform the following operations if the subsequent conference call is scheduled on a present day: (1) select a start time for the subsequent conference call; and (2) perform the autodial procedure for each participant from the list of participants to connect each participant to the subsequent call. Further, the disclosed system is configured present a visual indication of the automatic redial to the conference call organizer after performing the auto redial procedure.

In one embodiment of the disclosed invention, the mutual exclusion is implemented while switching the conference call control from an organizer to the participant of the conference call. The disclosed system may use shared memory and an atomic test-and-set instruction to provide the mutual exclusion. Thus, only one person via only one process can set a flag at a time, for example only one person can be designated as an organizer at any given time and make changes to the system and to databases at any given time. This is possible as only the call organizer is authorized to make changes to a conference call and there is only one organizer per call. Should the organizer delegate conference control to another participant, they are demoted from a host to a participant and can no longer make changes to the conference. Having the notion of the conference organizer being centrally managed and enforced makes this possible. Each call can only have one organizer is enforced by the backend using Application logic and an RDBMS which maintains data consistency and integrity. The mutual exclusion for organizational control is implemented by busy-waiting, compare and swap, semaphores and other similar techniques known the art.

What is claimed is:

1. A method configured to operate with a mobile phone to manage operations during simultaneous conference calls, the method comprising:
processing via a conference call server, each ongoing conference call by iteratively performing at a given time integral the following steps for a given conference call:
identifying a set of attributes of the given conference call from a conference call database, the set of attributes comprising: an end time, a set of participants, and a set of participant devices of the given conference call;
displaying, in real time, a calendar on the display of each device from the set of participant devices;
modifying from the displayed calendar, the set of participants upon adding or removing participants modifying the set of participants;

initiating an auto dial procedure for a subsequent conference call after reviewing the calendar to determine if a subsequent call is scheduled for the given time integral;

monitoring a connection status of each device from the set of participant devices and displaying the monitored connection status on the set of participant devices;

identifying a set of disconnected devices from the set of participant devices, wherein the disconnected device is previously connected but currently disconnected from the given conference call; and modifying the connection status of each disconnected device from the set of disconnected devices after performing an auto redial procedure for reconnecting each disconnected device with the given conference call; and terminating the given conference call if the end time of the given conference call is scheduled at the given time integral.

2. The method of claim 1, wherein the autodial procedure comprises the steps of:

ascertaining an identity, contact information and a preferred mode of communication of an organizer of the given conference call via an organizer database;

ascertaining an identity, contact information and a preferred mode of communication of the each invitee of the conference call via a participant database;

presenting a conference call invitation to each invitee of the conference call after connecting the organizer with the conference call;

receiving a response to the conference call invitation from each invitee of the conference call;

adding each invitee sending an acceptance response to the conference call invitation to generate a list of participants; and establishing a conference call connection between the organizer and each participant in the list of participants.

3. The method of claim 2, wherein the auto redial procedure comprises the steps of:

verifying that the disconnected device sent an acceptance response to the invitation;

ascertaining an identity, contact information and a preferred mode of communication of the disconnected device via the participant database;

presenting a second conference call connection invitation to the disconnected device;

receiving a second response to the second conference call invitation from disconnected device; and establishing a conference call connection between the participants of the given conference call and the disconnected device if the second response is an acceptance response.

4. The method of claim 3, further comprising the steps of:

maintaining a set of records in the conference call database, each record comprising: a conference call identifier, a date, a start time, an end time, a list of intended participant identifiers, a list of actual participants, a set of media files exchanged, and a status;

maintaining a set of records in the participant database, each record comprising: a participant identifier, a list of devices associated with each participant, a preferred mode of communication, and a participation history; and maintaining a set of records in the organizer database, each record comprising: an organizer identifier, a list of devices associated with each organizer, a preferred mode of communication, and a participation history indicating at least one conference call identifier.

5. The method of claim 3, further comprising displaying the calendar to schedule a subsequent conference call.

6. The method of claim 5, wherein the subsequent conference call is a future conference call and wherein the step of displaying the calendar comprises the steps of:

selecting a future date, a start time, and a set of invitees for the subsequent conference call; and performing on the future date, the auto dial procedure for each participant from the list of participants to connect each participant to the subsequent conference call.

7. The method of claim 6, further comprising the steps of:

adding each participant sending a rejection response to the invitation to a do not call database.

8. The method of claim 5, the step of displaying the calendar further comprises the following steps if the subsequent conference call is scheduled on a present day:

selecting a start time for the subsequent conference call; and performing the autodial procedure for each participant from the list of participants to connect each participant to the subsequent call.

9. The method of claim 5, further comprising the steps of:

presenting a visual indication of the automatic redial to the conference call organizer after performing the auto redial procedure.

10. A system configured to operate with a mobile phone to manage operations during simultaneous conference calls, the system comprising:

a conference call management system comprising a conference call server for processing each ongoing conference call by iteratively processing a given conference call at a given time integral, the conference call management system comprising:

a calendar controller to identify a set of attributes of the given conference call from a conference call database, the set of attributes comprising: an end time, a set of participants, and a set of participant devices of the given conference call;

a calendar interface to display, in real time, a calendar interface on the display of each device from the set of participant devices;

a participant modify interface displayed on the calendar interface, to modify the set of participants;

an autodial handler to initiate an auto dial procedure for a subsequent conference call after reviewing the calendar to determine if a subsequent call is scheduled for the given time integral;

a status monitoring system communicatively coupled to the conference call management system to monitor a connection status of each device from the set of participant devices;

a display controller to display the monitored connection status on the set of participant devices;

a conference call participant status handler to identify a set of disconnected devices from the set of participant devices, wherein the disconnected device is previously connected but currently disconnected from the given conference call; and a connection handler to modify the connection status of each disconnected device from the set of disconnected devices after performing an auto redial procedure for reconnecting each disconnected device with the given conference call; and a connection handler to terminate the given conference call if the end time of the given conference call is scheduled at the given time integral.

11. The system of claim 10, wherein the connection handler is configured to:
   ascertain an identity, contact information and a preferred mode of communication of an organizer of the given conference call via an organizer database;
   ascertain an identity, contact information and a preferred mode of communication of each invitee of the conference call via a participant database;
   present a conference call invitation to each invitee of the conference call after connecting the organizer with the conference call;
   receive a response to the conference call invitation from each invitee of the conference call;
   add each invitee sending an acceptance response to the conference call invitation to generate a list of participants; and
   establish a conference call connection between the organizer and each participant in the list of participants.

12. The system of claim 10, wherein the conference call participant status handler is further configured to:
   verify that the disconnected device sent an acceptance response to the invitation;
   ascertain an identity, contact information and a preferred mode of communication of the disconnected device via the participant database;
   present a second conference call connection invitation to the disconnected device;
   receive a second response to the second conference call invitation from disconnected device; and
   establish a conference call connection between the participants of the given conference call and the disconnected device if the second response is an acceptance response.

13. The system of claim 12, further comprising a data monitoring unit configured to:
   maintain a set of records in the conference call database, each record comprising: a conference call identifier, a date, a start time, an end time, a list of intended participant identifiers, a list of actual participants, a set of media files exchanged, and a status;
   maintain a set of records in the participant database, each record comprising: a participant identifier, a list of devices associated with each participant, a preferred mode of communication, and a participation history; and
   maintain a set of records in the organizer database, each record comprising: an organizer identifier, a list of devices associated with each organizer, a preferred mode of communication, and a participation history indicating at least one conference call identifier.

14. The system of claim 12, wherein the display controller is further configured to display the calendar to schedule a subsequent conference call.

15. The system of claim 14, wherein the subsequent conference call is a future conference call and wherein the display controller is further configured to:
   select a future date, a start time, and a set of invitees for the subsequent conference call; and
   cause the conference call management system to perform on the future date, the auto dial procedure for each participant from the list of participants to connect each participant to the subsequent conference call.

16. The system of claim 15, further configured to add each participant sending a rejection response to the invitation to a do not call database.

17. The system of claim 14, further configured to perform the following operations if the subsequent conference call is scheduled on a present day:
   select a start time for the subsequent conference call; and
   perform the autodial procedure for each participant from the list of participants to connect each participant to the subsequent call.

18. The system of claim 14, further configured to perform the following operations:
   present a visual indication of the automatic redial to the conference call organizer after performing the auto redial procedure.

* * * * *